US012303467B2

(12) United States Patent
Yamashita et al.

(10) Patent No.: US 12,303,467 B2
(45) Date of Patent: May 20, 2025

(54) TABLET RECEPTACLE AND DRUG DISPENSING DEVICE

(71) Applicant: YUYAMA MFG. CO., LTD., Osaka (JP)

(72) Inventors: Koji Yamashita, Osaka (JP); Yoshinori Taniguchi, Osaka (JP)

(73) Assignee: YUYAMA MFG. CO., LTD., Osaka (JP)

( * ) Notice: Subject to any disclaimer, the term of this patent is extended or adjusted under 35 U.S.C. 154(b) by 137 days.

(21) Appl. No.: 17/996,336

(22) PCT Filed: Apr. 14, 2021

(86) PCT No.: PCT/JP2021/015514
§ 371 (c)(1),
(2) Date: Oct. 14, 2022

(87) PCT Pub. No.: WO2021/210624
PCT Pub. Date: Oct. 21, 2021

(65) Prior Publication Data

US 2023/0190583 A1 Jun. 22, 2023

(30) Foreign Application Priority Data

Apr. 18, 2020 (JP) ................................ 2020-074442

(51) Int. Cl.
*A61J 7/02* (2006.01)

(52) U.S. Cl.
CPC .............. *A61J 7/02* (2013.01); *A61J 2205/60* (2013.01)

(58) Field of Classification Search
CPC ........................................................ A61J 7/02
See application file for complete search history.

(56) References Cited

U.S. PATENT DOCUMENTS 6,581,355 B1 6/2003 Yuyama et al.
6,581,356 B2 * 6/2003 Kim ....................... G07F 11/44 221/124

(Continued)

FOREIGN PATENT DOCUMENTS

CN 102083691 A 6/2011
JP 2001-130504 A 5/2001

(Continued)

OTHER PUBLICATIONS

European Patent Office, European Search Report mailed on Jan. 5, 2024 in European Patent Application No. 21787809.9, 4 pages.

(Continued)

*Primary Examiner* — Gene O Crawford
*Assistant Examiner* — Ayodeji T Ojofeitimi
(74) *Attorney, Agent, or Firm* — MASUVALLEY & PARTNERS; Peter Martinez

(57) ABSTRACT

A tablet receptacle 50 receives the tablets discharged to the tablet dropping passage below a mounting part 12 in the drug dispensing device in which the tablets are packaged by being discharged from a tablet cassette 11 to a tablet dropping passage 42 through the mounting part 12. The tablet receptacle 50 includes a receiving port 50*g* to be inserted into the tablet dropping passage 42 when the tablet receptacle 50 is installed. The receiving port 50*g* is configured to receive the tablets discharged from the tablet cassette 11 mounted on the mounting part 12 located above the tablet receptacle 50 and dropped along the tablet dropping passage 42.

10 Claims, 29 Drawing Sheets

(56) References Cited

U.S. PATENT DOCUMENTS

| | | | | |
|---|---|---|---|---|
| 7,848,846 | B2 | 12/2010 | Uema et al. | |
| 8,234,838 | B2 * | 8/2012 | Yasunaga | B65B 5/103<br>53/154 |
| 8,863,480 | B2 * | 10/2014 | Knoth | B65B 5/103<br>221/121 |
| 9,582,956 | B2 | 2/2017 | Yuyama et al. | |
| 2008/0264967 | A1 * | 10/2008 | Schifman | G07F 17/0092<br>221/133 |
| 2009/0321469 | A1 * | 12/2009 | Knoth | B65B 5/103<br>221/7 |
| 2010/0116837 | A1 | 5/2010 | Kim | |
| 2011/0170655 | A1 | 7/2011 | Yuyama et al. | |
| 2013/0240555 | A1 | 9/2013 | Kim | |
| 2013/0270291 | A1 | 10/2013 | Omura et al. | |
| 2013/0284755 | A1 * | 10/2013 | Yuyama | G07F 11/44<br>221/277 |
| 2013/0320033 | A1 * | 12/2013 | Brug | B65B 35/08<br>221/265 |
| 2014/0097195 | A1 | 4/2014 | Anthony et al. | |
| 2015/0101291 | A1 | 4/2015 | Ishiwatari et al. | |
| 2015/0120039 | A1 | 4/2015 | Nishibue | |
| 2019/0080790 | A1 | 3/2019 | Patel | |

FOREIGN PATENT DOCUMENTS

| | | | |
|---|---|---|---|
| JP | 2002-291845 | A | 10/2002 |
| JP | 2010-115493 | A | 5/2010 |
| JP | 2013-545546 | A | 12/2013 |
| JP | 2021-016598 | A | 2/2021 |
| WO | 2013/171821 | A1 | 11/2013 |
| WO | 2017/159819 | A1 | 9/2017 |

OTHER PUBLICATIONS

WIPO, Japanese International Search Authority, International Search Report (with English translation) and Written Opinion mailed on Jul. 6, 2021 in International Patent Application No. PCT/JP2021/015514, 14 pages.

Taiwan Patent Office, Examination Opinion with English Translation dated Jul. 2, 2024 in Taiwan Patent Application No. 110113768, 11 pages.

The State Intellectual Property Office of People's Republic of China, Office Action with English Translation dated Apr. 2, 2025 in Chinese Patent Application No. 202180024808.1, 15 pages.

* cited by examiner (a)

(b)

(a)

(b)

TABLET RECEPTACLE AND DRUG DISPENSING DEVICE

RELATED APPLICATIONS

This application is the U.S. National Phase of and claims priority to International Patent Application No. PCT/JP2021/015514, International Filing Date Apr. 14, 2021; which claims benefit of Japanese Patent Application No. 2020-074442, filed Apr. 18, 2020; both of which are incorporated herein by reference in their entireties.

TECHNICAL FIELD

The present invention relates to a tablet receptacle used during stocktaking of tablets and a drug dispensing device which can be used for the stocktaking of the tablets.

BACKGROUND ART

For example, in a pharmacy, stocktaking work is carried out once a month. The stocktaking work is work for determining profit as follows. A stock of opened and unopened drugs on dispensing shelves inside the pharmacy and the number of drugs remaining inside a drug dispensing device are counted for each drug to examine a stock amount of money. In the related art, the drugs remaining inside the drug dispensing device are manually counted, or are counted by using a dedicated counting device.

Manually counting the tablets in the drug dispensing device is time-consuming, thereby causing a counting error. In addition, the counting device needs purchasing expense, and has a problem in that a large installation space is required.

PTL 1 discloses a drug dispensing device configured as follows. In order to collect tablets remaining in a variable cassette, a placement table for placing a drug accommodation unit is provided below the variable cassette, and a second passage branched from a first passage of the variable cassette is provided to be switchable. The drug dispensing device includes a collection unit for collecting the tablets in the variable cassette via the second passage to the drug accommodation unit. However, the collection unit disclosed in PTL 1 needs to be provided with the second passage.

CITATION LIST

Patent Literature

[PTL 1] International Publication WO2017/159819

SUMMARY OF INVENTION

Technical Problem

The present invention is made in view of the above-described problems in the related art, and an object of the present invention is to provide a tablet receptacle capable of receiving tablets discharged from a tablet cassette mounted on a drug dispensing device, and a drug dispensing device capable of performing a stocktaking process by using the tablet receptacle, without providing a special discharge passage or a special installation space, during stocktaking of the tablet cassette of the drug dispensing device.

Solution to Problem

In order to solve the above-described problems, the present invention adopts the following means.

According to first means, there is provided a tablet receptacle.

The tablet receptacle receives tablets discharged to a tablet dropping passage below a plurality of mounting parts in a drug dispensing device in which the mounting parts on which tablet cassettes are mounted are arranged, and the tablets are packaged by being discharged from the tablet cassettes to the tablet dropping passage.

The tablet receptacle includes a receiving port to be inserted into the tablet dropping passage when the tablet receptacle is installed.

The tablet receptacle according to the first means receives the tablets discharged to the tablet dropping passage below the mounting parts. Therefore, there is no need to provide a special installation space.

In addition, the tablet receptacle includes the receiving port to be inserted into the tablet dropping passage. Therefore, there is no need to provide a special discharge passage.

According to second means, there is provided a tablet receptacle.

The tablet receptacle which is mounted to be replaceable with tablet cassette on any one of a plurality of mounting parts in a drug dispensing device in which the mounting parts on which the tablet cassettes are mounted are arranged, and tablets are packaged by being discharged from the tablet cassettes to a tablet dropping passage, and which receives the tablets discharged to the tablet dropping passage.

The tablet receptacle includes a receiving port that is inserted into the tablet dropping passage when the tablet receptacle is mounted on the mounting part.

The tablet receptacle according to the second means is replaced with the tablet cassettes and mounted on any one of the mounting parts. Therefore, there is no need to provide a special installation space.

In addition, the tablet receptacle includes the receiving port to be inserted into the tablet dropping passage when the tablet receptacle is installed in the mounting part. Therefore, there is no need to provide a special discharge passage.

In the first and second tablet receptacles, the receiving port includes a receiving plate that is pivotable to have a steep inclination angle formed inward of the tablet receptacle when the tablet receptacle is mounted on the mounting part.

According to this configuration, the receiving plate of the receiving port is steeply inclined. Therefore, the tablets dispensed from the tablet cassettes collide with the receiving plate of the receiving port, and vigorously enter the inside of the tablet receptacle. Therefore, an entrance of the tablet receptacle is not clogged with the tablets.

The first and second tablet receptacles include a vibration mechanism that vibrates the tablet receptacle.

According to this configuration, as a result of vibrating the tablet receptacle, a gap between the tablets discharged to the tablet receptacle is clogged, and the tablets are densely stacked. Therefore, the tablets can be sufficiently accommodated up to container accommodation capacity.

In the first and second tablet receptacles, the vibration mechanism is configured to be driven by a drive unit driving the tablet cassette and provided in the mounting part.

According to this configuration, there is no need to provide a power source for the vibration mechanism in the tablet receptacle.

The first and second tablet receptacles further includes a tablet guide extending obliquely downward from a bottom portion of the receiving port toward an inside of the tablet receptacle.

According to this configuration, the tablets received by the receiving port are dropped on both sides while sliding down along the guide. Therefore, the tablets are uniformly accumulated in the bottom of the tablet receptacle.

It is preferable that the vibration mechanism vibrates the tablet guide of the tablet receptacle. In this manner, it is possible to prevent clogging of the receiving port due to the tablets accumulated in the tablet guide.

The first and second tablet receptacles further include a shutter that opens and closes a dropping port formed in a bottom of the tablet receptacle.

According to this configuration, the tablets received in the tablet receptacle are placed on the tablet cassette, and the dropping port is opened by the shutter. In this manner, the tablets can quickly return to the tablet cassette at once without any left tablet.

The first and second tablet receptacles further include the receiving port in the tablet cassette.

According to this configuration, the tablet receptacle can be used only by providing the receiving port in the tablet cassette. Therefore, the tablet receptacle can be mounted on the mounting part in the same manner as the tablet cassette, and there is no need to prepare a special tablet receptacle.

According to third means, there is provided a tablet receptacle.

The tablet receptacle receives tablets discharged to a tablet dropping passage below a plurality of mounting parts in a drug dispensing device in which the mounting parts on which tablet cassettes are mounted are arranged, and the tablets are packaged in a packaging unit by being discharged from the tablet cassettes to the tablet dropping passage.

The tablet receptacle includes switching means for switching a discharge destination of the tablet discharged to the tablet dropping passage from the tablet cassette mounted on the mounting part located above the mounting part from the packaging unit to the tablet receptacle, when the tablet receptacle is mounted on the mounting part.

Here, it is preferable that the switching means is the receiving port to be inserted into the tablet dropping passage when the tablet receptacle is mounted on the mounting part.

According to fourth means, there is provided a drug dispensing device.

In the drug dispensing device in which a plurality of mounting parts on which a tablet cassette is mounted are arranged, and tablets are packaged by being discharged from the tablet cassettes to a tablet dropping passage, the drug dispensing device includes a tablet receptacle that receives the tablets discharged to the tablet dropping passage below the mounting part.

The tablet receptacle includes a receiving port to be inserted into the tablet dropping passage.

The receiving port is configured to receive the tablets discharged from the tablet cassette mounted on the mounting part above the tablet receptacle and dropped along the tablet dropping passage.

The drug dispensing device according to the fourth means receives the tablets discharged to the tablet dropping passage below the mounting parts. Therefore, there is no need to provide a special installation space.

In addition, the tablet receptacle includes the receiving port to be inserted into the tablet dropping passage. Therefore, there is no need to provide a special discharge passage.

According to fifth means, there is provided a drug dispensing device.

In the drug dispensing device in which a plurality of mounting parts on which tablet cassettes are mounted are arranged, and tablets are packaged by being discharged from the tablet cassettes to a tablet dropping passage through the mounting part, the drug dispensing device includes a tablet receptacle to be replaced with the tablet cassette and mounted on any one of the mounting parts.

The tablet receptacle includes a receiving port to be inserted into the tablet dropping passage when the tablet receptacle is mounted on the mounting part.

The receiving port is configured to receive the tablets discharged from the tablet cassette mounted on the mounting part above the mounting part on which the tablet receptacle is mounted and dropped along the tablet dropping passage.

The drug dispensing device according to the fifth means is replaced with the tablet cassettes and mounted on any one of the mounting parts. Therefore, there is no need to provide a special installation space.

In addition, the tablet receptacle includes the receiving port to be inserted into the tablet dropping passage when the tablet receptacle is installed in the mounting part. Therefore, there is no need to provide a special discharge passage.

In the drug dispensing device according to the fourth and fifth means, a tablet discharge port communicating with a tablet discharge passage of the mounting part, and a receptacle insertion port provided below the tablet discharge port are formed in the tablet dropping passage.

The receiving port of the tablet receptacle is inserted into the receptacle insertion port, and a tablet receiving passage is formed, the tablet receiving passage extending to an inside of the tablet receptacle from the tablet discharge passage of the mounting part through the tablet discharge port, the tablet dropping passage, and the receiving port.

According to this configuration, the receiving port of the tablet receptacle is inserted into the receptacle insertion port of the tablet dropping passage only by installing the tablet receptacle. In this manner, a tablet receiving passage is formed.

In addition, the drug dispensing device further includes closing means for closing the tablet discharge passage of the mounting part located one above the mounting part on which the tablet receptacle is mounted.

According to this configuration, it is possible to prevent the tablet rebounding in the receiving port from being ejected outward from the upper tablet discharge port.

In the drug dispensing device according to the fourth and fifth means, the receptacle insertion port includes a movable plate that opens and closes the receptacle insertion port, and the movable plate is configured to open the receptacle insertion port, when the receiving port of the tablet receptacle is inserted into the receptacle insertion port.

According to this configuration, the receiving port of the tablet receptacle is inserted into the receptacle insertion port of the tablet dropping passage only by installing the tablet receptacle. In this manner, the movable plate opens the receptacle insertion port, and the tablet receiving passage is formed.

In the drug dispensing device according to the fourth and fifth means, the tablet receptacles are respectively mounted on the mounting parts in a plurality of stages.

Each of the tablet receptacles is configured to simultaneously receive the tablets in the tablet cassette mounted on the mounting part above the mounting part on which the tablet receptacle is mounted.

According to this configuration, the tablets can be simultaneously received by each of the tablet receptacles from the tablet cassettes in the plurality of stages, and stocktaking work can be quickly carried out.

In the drug dispensing device according to the fourth and fifth means, the mounting parts in a plurality of stages are provided in a plurality of rows.

The tablet receptacles are respectively mounted below the mounting parts in the plurality of rows.

Each of the tablet receptacles is configured to simultaneously receive the tablets in the tablet cassette mounted on the mounting part above the mounting part on which the tablet receptacle is mounted.

According to this configuration, the tablets can be simultaneously received by each of the tablet receptacles from the tablet cassettes in the plurality of rows, and stocktaking work can be quickly carried out.

In the drug dispensing device according to the fourth and fifth means, the tablet receptacle includes an identification device that stores receptacle identification information and cassette identification information of the tablet cassette for counting the tablets.

A reader for reading the receptacle identification information and the cassette identification information of the identification device of the tablet receptacle is provided in the drug dispensing device.

The tablet receptacle is configured to shift to a tablet counting mode of the tablet cassette corresponding to the cassette identification information, when the reader of the drug dispensing device reads the receptacle identification information of the identification device and the cassette identification information of the tablet receptacle.

According to this configuration, when the tablet receptacle is installed by causing the identification device of the tablet receptacle to store the receptacle identification information and the cassette identification information of the tablet cassette for counting the tablets, the reader of the drug dispensing device reads the receptacle identification information and the cassette identification information of the identification device of the receptacle. The mode is shifted to the tablet counting mode of the tablet cassette corresponding to the cassette identification information, and the tablets in the tablet cassette are counted by using a counting function of the drug dispensing device. Therefore, there is no need to provide a special tablet counting device.

In the drug dispensing device according to the fourth and fifth means, the drug dispensing device includes a tablet filling table on which the tablet receptacle and the tablet cassette serving as the stocktaking object are placed, a receptacle reader for reading the identification information of the identification device provided in the tablet receptacle, and a cassette reader that reads the identification information of the identification device provided in the tablet cassette serving as the stocktaking object placed on the tablet filling table.

The drug dispensing device is configured to notify that the identification information read by the receptacle reader and the identification information read by the cassette reader coincide with each other.

According to this configuration, the drug dispensing device notifies that both the identification information of the tablet receptacle receiving the tablets and the tablet cassette discharging the tablets coincide with each other, and the tablets in the tablet receptacle are allowed to be fed to the tablet cassette. Therefore, the tablets in the tablet receptacle can reliably return to the tablet cassette without any error.

According to sixth means, there is provided a drug dispensing device.

In the drug dispensing device in which a plurality of mounting parts on which tablet cassettes are mounted are arranged, and tablets are packaged in a packaging unit by being discharged from the tablet cassettes to a tablet dropping passage, the drug dispensing device is configured to switch a discharge destination of the tablet discharged to the tablet dropping passage from the tablet cassette mounted on the mounting part located above a tablet receptacle from the packaging unit to the tablet receptacle, when the tablet receptacle is mounted.

According to this configuration, there is no need to provide a special passage or a special space for receiving the tablets in the tablet receptacle.

According to seventh means, the drug dispensing device further includes receptacle detection means for detecting that the tablet receptacle is mounted on the mounting part.

The drug dispensing device is configured to switch a discharge destination of the tablet discharged to the tablet dropping passage from the packaging unit to the tablet receptacle, when the receptacle detection means detects the tablet receptacle.

According to this configuration, the tablet packaging passage can be switched to the tablet receiving passage only by mounting the tablet receptacle, and there is no need to install a special device for switching the passages.

According to eighth means, there is provided a tablet discharge destination switching method.

In the tablet discharge destination switching method in a drug dispensing device in which a plurality of mounting parts on which tablet cassettes are mounted are arranged, and tablets are packaged in a packaging unit by being discharged from the tablet cassettes to a tablet dropping passage, the tablet discharge destination switching method includes causing a tablet receptacle to switch a discharge destination of the tablet discharged from the tablet cassette of the drug dispensing device, from the packaging unit to an inside of the tablet receptacle.

Advantageous Effects of Invention

According to the tablet receptacle of the present invention, the tablet receptacle can receive the tablets discharged from the tablet cassette mounted on the drug dispensing device, without providing a special discharge passage or a special installation space, during the stocktaking of the tablet cassette of the drug dispensing device.

In addition, according to the drug dispensing device of the present invention, the tablet receiving passage is formed only by mounting the tablet receptacle, and a stocktaking process can be performed by using a tablet counting function of the drug dispensing device itself. Therefore, there is an advantageous effect in that there is no need to separately provide a tablet counting device or to secure an installation space thereof.

BRIEF DESCRIPTION OF DRAWINGS

FIG. 20 is a plan view illustrating an operation of the vibration mechanism in

FIG. 19.

DESCRIPTION OF EMBODIMENTS

Hereinafter, embodiments of the present invention will be described with reference to the accompanying drawings.

Figure 1:
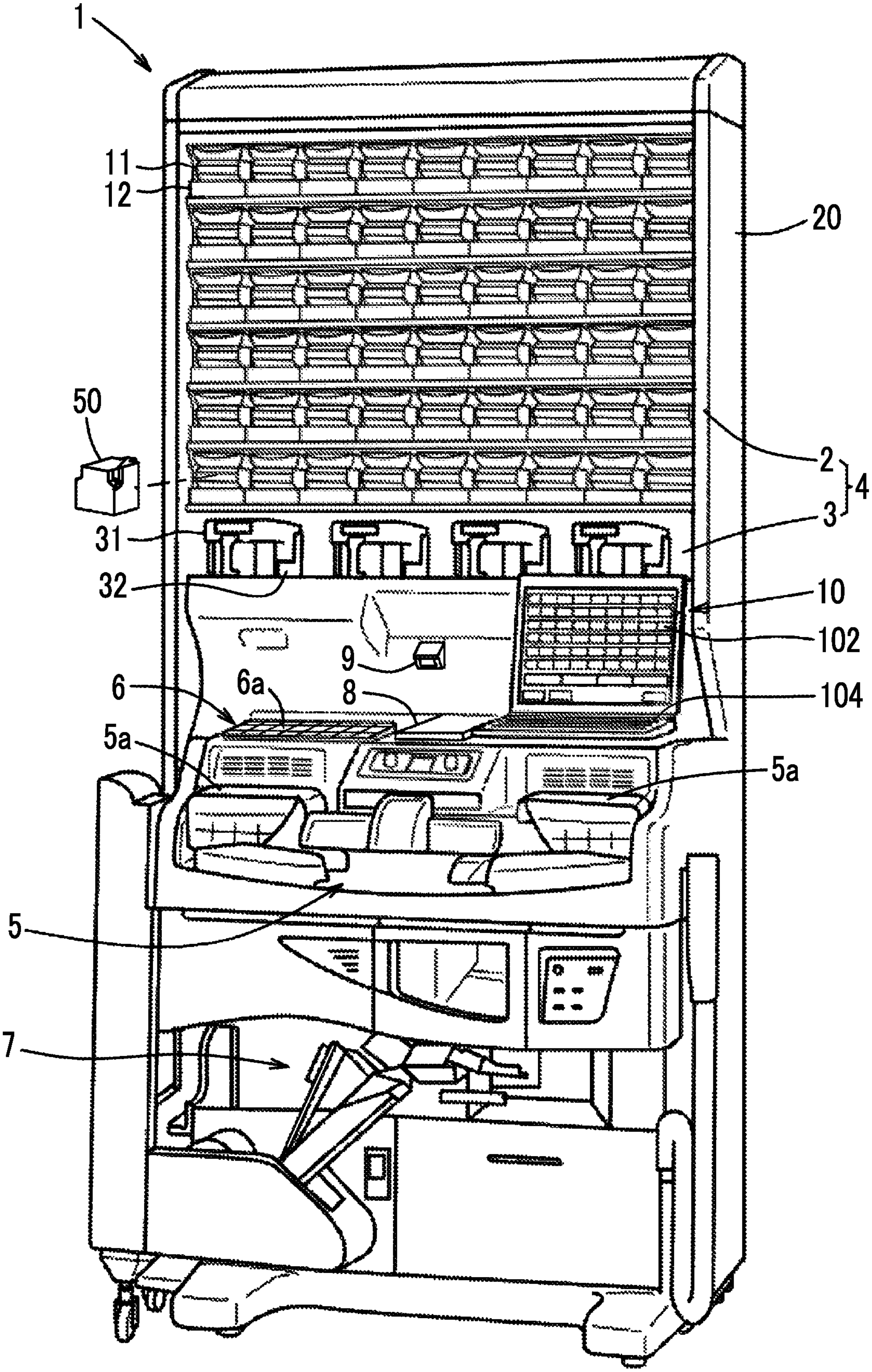
FIG. 1 is a perspective view of a drug dispensing device according to a first embodiment of the present invention.

FIG. 1 illustrates a drug dispensing device 1 of a first example using a tablet receptacle according to an embodiment of the present invention. The drug dispensing device 1 includes a tablet supply unit 4 having a first tablet supply unit 2 and a second tablet supply unit 3, a powder medicine supply unit 5, a manual distribution unit 6, a packaging unit 7, a tablet filling table 8, a bar code reader 9, and a control unit 10.

The first tablet supply unit 2 is configured to include a tablet cassette 11 and a mounting part 12 which the tablet cassette 11 is attachable to and detachable from, and in an example illustrated in FIG. 1, 54 sets in total are provided in 6 stages and 9 rows.

Figure 2:
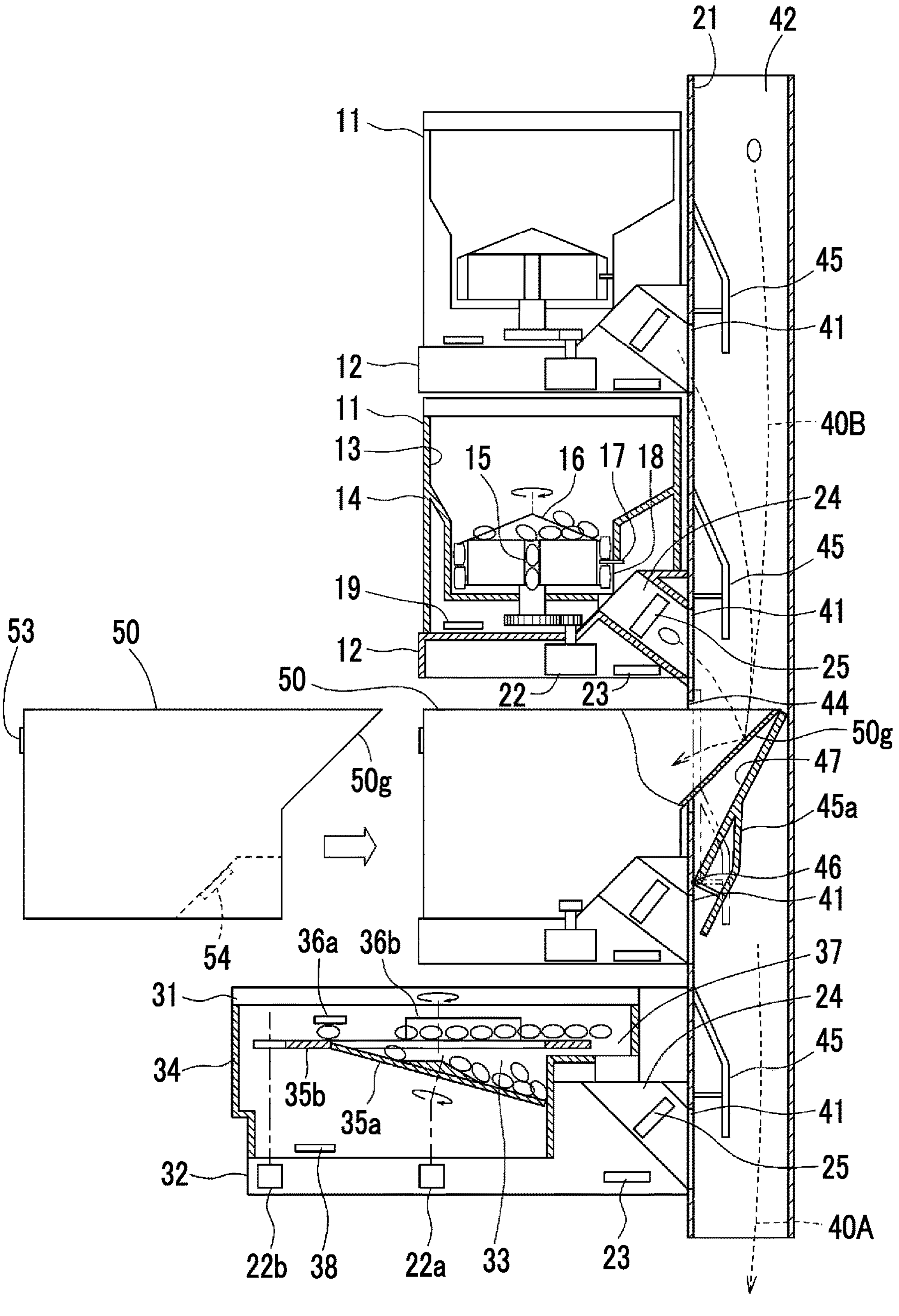
FIG. 2 is a cross-sectional view of the drug dispensing device on which a tablet cassette and a tablet receptacle are mounted.

As illustrated in FIG. 2, each of the tablet cassettes 11 is a well-known one including a cassette body 14 having a tablet accommodation unit 13 for accommodating a large number of predetermined tablets, a rotor 16 rotatably provided in a bottom of the tablet accommodation unit 13 and having a plurality of tablet guide grooves 15, and a partition member 17 partitioning the tablet guide groove 15 of the rotor 16. The tablet cassette 11 is configured as follows. As the rotor 16 rotates, the tablet in the tablet accommodation unit 13 enters the tablet guide groove 15. Each time the tablet guide groove 15 reaches above a tablet outlet 18 formed in the cassette body 14, the tablets below the partition member 17 of the tablet guide groove 15 are discharged one by one from the tablet outlet 18. An RFID tag 19 is attached to the tablet cassette 11 as an identification device. Radio frequency identification (RFID) is an automatic identification technology using short-range wireless communication for reading and writing information between an RFID tag and an RFID reader/writer. At least one of identification information of the tablet cassette 11 and drug type identification information of the tablets accommodated in the tablet cassette 11, or an address of information relating to the tablet cassette 11 recorded in the storage unit 10*b* is written on the RFID tag 19. In addition to the RFID tag, as an identification device, a bar code such as Interleaved Two of Five (ITF) can be used.

Each of the mounting parts 12 is provided in a shelf shape on a wall portion 21 of a device body 20, and a drive motor 22 for driving the rotor 16 of the tablet cassette 11 and an RFID reader/writer 23 serving as a reader for reading the RFID tag 19 of the tablet cassette 11 are incorporated therein. A tablet discharge passage 24 communicating with the tablet outlet 18 of the tablet cassette 11 is formed in the mounting part 12. A tablet detection sensor 25 for detecting the tablets discharged from the tablet outlet 18 is provided in the tablet discharge passage 24.

Referring back to FIG. 1, the second tablet supply unit 3 is disposed below the first tablet supply unit 2, and is configured to include a universal tablet cassette 31 and a mounting part 32 which the universal tablet cassette 31 is attachable to and detachable from. In an example illustrated in FIG. 1, 4 sets in total are provided in 1 stage and 4 rows.

As illustrated in FIG. 2, the universal tablet cassette 31 is a well-known one including a cassette body 34 having a tablet accommodation unit 33, and a first rotating body 35*a* provided in a bottom of the tablet accommodation unit 33 to be inclined at a predetermined angle with respect to a vertical direction, an annular second rotating body 35*b* disposed around the first rotating body 35*a*, a height restricting member 36*a*, and a width restricting member 36*b*. The universal tablet cassette 31 is configured as follows. As the first rotating body 35*a* rotates, the tablets in the tablet accommodation unit 33 move from the first rotating body 35*a* to the second rotating body 35*b*, and pass through the height restricting member 36*a* and the width restricting member 36*b* while being transported on the second rotating body 35*b*. In this manner, the tablets are aligned one by one, and are discharged from a tablet outlet 37. Restricting dimensions of the height restricting member 36*a* and the width restricting member 36*b* are adjusted depending on a shape and a size of the tablets accommodated in the tablet accommodation unit 33. Therefore, the tablets having all shapes and sizes can be discharged. An RFID tag 38 is attached to the universal tablet cassette 31 as an identification device. At least one of identification information of the universal tablet cassette 31 and drug type identification information of the tablets accommodated in the universal tablet cassette 31 is written in the RFID tag 38. In addition to the RFID tag, as an identification device, a bar code such as Interleaved Two of Five (ITF) can be used.

Each of the mounting part 32 is provided on the wall portion 21 of the device body 20, and drive gears 22*a* and 22*b* for driving the first rotating body 35*a* and the second rotating body 35*b* of the universal tablet cassette 31 are incorporated therein. A tablet discharge passage 24 communicating with the tablet outlet 37 of the universal tablet cassette 31 is formed in the mounting part 32. The tablet discharge passage 24 is provided with a tablet detection sensor 25 for detecting the tablets discharged from the tablet outlet 37.

The wall portion 21 of the device body 20 to which the mounting parts 12 and 32 of the first tablet supply unit 2 and the second tablet supply unit 3 are attached has the tablet discharge passage 24 of the mounting part 12 of the first tablet supply unit 2 and a tablet discharge port 41 communicating with the tablet discharge passage 24 of the mounting part 32 of the second tablet supply unit 3. In addition, on a rear surface of the wall portion 21 of the device body 20, tablet dropping passages 42 are respectively provided in each row of the first tablet supply unit 2, in each of nine rows in an example illustrated in the drawing. A lower end of the tablet dropping passage 42 is received by a guide hopper 43 (refer to FIG. 26) of the packaging unit 7, and the tablets supplied from the first tablet supply unit 2 and the second tablet supply unit 3 can be packaged by the packaging unit 7. Each of the tablet dropping passages 42 communicates with each of the tablet discharge passages 24 of the mounting part 12 of the first tablet supply unit 2 and the mounting part 32 of the second tablet supply unit 3 via the tablet discharge port 41.

Figure 3:
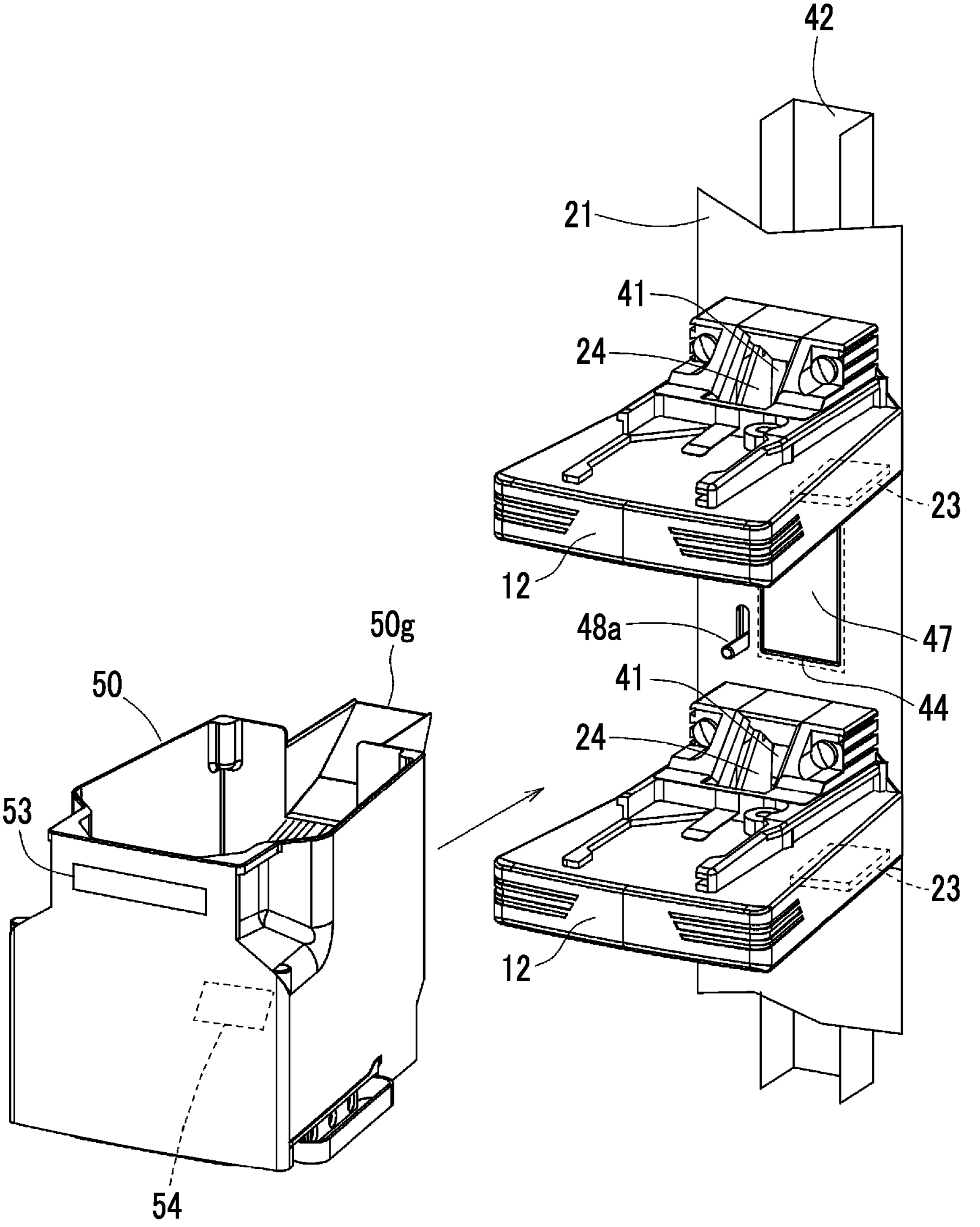
FIG. 3 is a perspective view when a mounting part for mounting the tablet receptacle is obliquely viewed from a front side.

As illustrated in FIG. 3, the wall portion 21 of the device body 20 to which a lowermost mounting part 12 of the first tablet supply unit 2 is attached has a receptacle insertion port 44 into which a receiving port 50*g* of a tablet receptacle 50 (to be described later) is inserted. The receptacle insertion port 44 communicates with the tablet dropping passage 42, and has a width the same as a width of the tablet dropping passage 42. Therefore, the lowermost mounting part 12 and surroundings thereof have the tablet discharge passage 24, the tablet discharge port 41 of the mounting part 12, and the receptacle insertion port 44 located above the tablet discharge port 41. In other words, the receptacle insertion port 44 is located between the tablet discharge port 41 through which the tablets discharged from the tablet cassette 11 mounted on the lowermost mounting part 12 pass and the tablet discharge port 41 through which the tablets discharged from the tablet cassette 11 mounted on the mounting part 12 which is second from below pass. Even when the tablet cassette 11 is mounted on the mounting part 12, a portion of the tablet cassette 11 is not inserted into the tablet dropping passage 42 from the receptacle insertion port 44.

As illustrated in FIG. 2, a rebounding prevention member 45 preventing a possibility that the tablets dropped from above along the tablet dropping passage 42 may delay dropping of the tablets by entering the tablet discharge passage 24 through the tablet discharge port 41 and rebounding on an inclined surface of the tablet discharge passage 24 is provided above each of the tablet discharge ports 41. The rebounding prevention member 45*a* provided in the tablet discharge port 41 of the lowermost mounting part 12 of the first tablet supply unit 2 has a movable plate 47 attached by a hinge 46 so that an upper end pivots in a direction separated from the wall portion 21 and opening and closing the receptacle insertion port 44 from the inside of the tablet dropping passage 42. The rebounding prevention member 45*a* having the movable plate 47 is biased by spring means (not illustrated) in a direction in which the movable plate 47 closes the receptacle insertion port 44.

Figure 4:
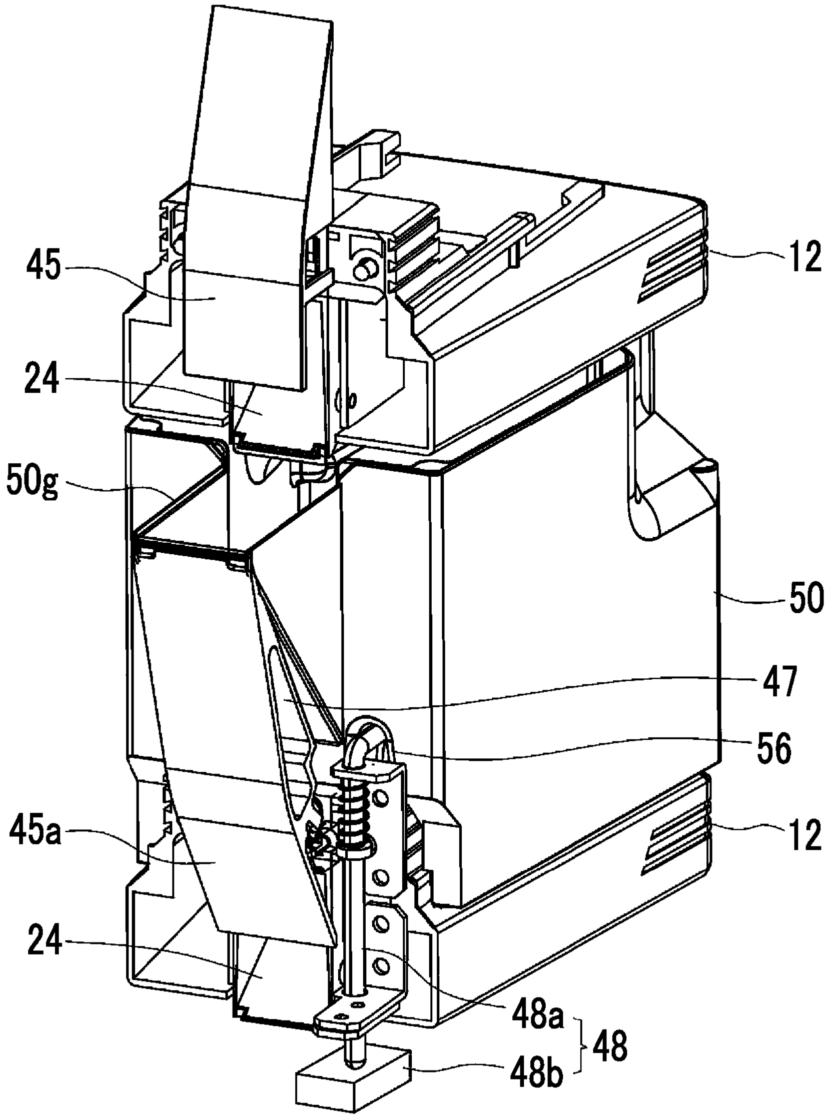
FIG. 4 is a perspective view when the mounting part on which the tablet receptacle is mounted is obliquely viewed from a rear side.

As illustrated in FIG. 4, a receptacle detection sensor 48 for detecting that the tablet receptacle 50 (to be described later) is mounted is provided on the wall portion 21 of the device body 20 on which the lowermost mounting part 12 of the first tablet supply unit 2 is mounted. The receptacle detection sensor 48 includes a detection rod 48*a* that moves downward when an engagement portion 56 of the tablet receptacle 50 comes into the detection rod 48*a*, and a sensor portion 48*b* for detecting a movement of the detection rod 48*a*.

Referring back to FIG. 1, the powder medicine supply unit 5 is a well-known one that uniformly spreads a powder medicine fed from two feeding portions 5*a* onto a disk having an annular groove (not illustrated), scrapes the powder medicine out at each predetermined angle, and supplies the powder medicine to the packaging unit 7, and packages the powder medicine for each predetermined dosing time.

The manual distribution unit 6 is a well-known one that accommodates the tablets in a manual distribution portion 6*a* having a large number of mass shapes, opens the bottom of each mass, supplies the tablets to the packaging unit, and packages the tablets for each predetermined dosing time.

The packaging unit 7 is a well-known one that packages the tablets supplied from the tablet supply unit 4 having the first tablet supply unit 2 and the second tablet supply unit 3, the powder medicine supply unit 5, and the manual distribution unit 6 into a drug packaging sheet for each dosing time.

Figure 5:
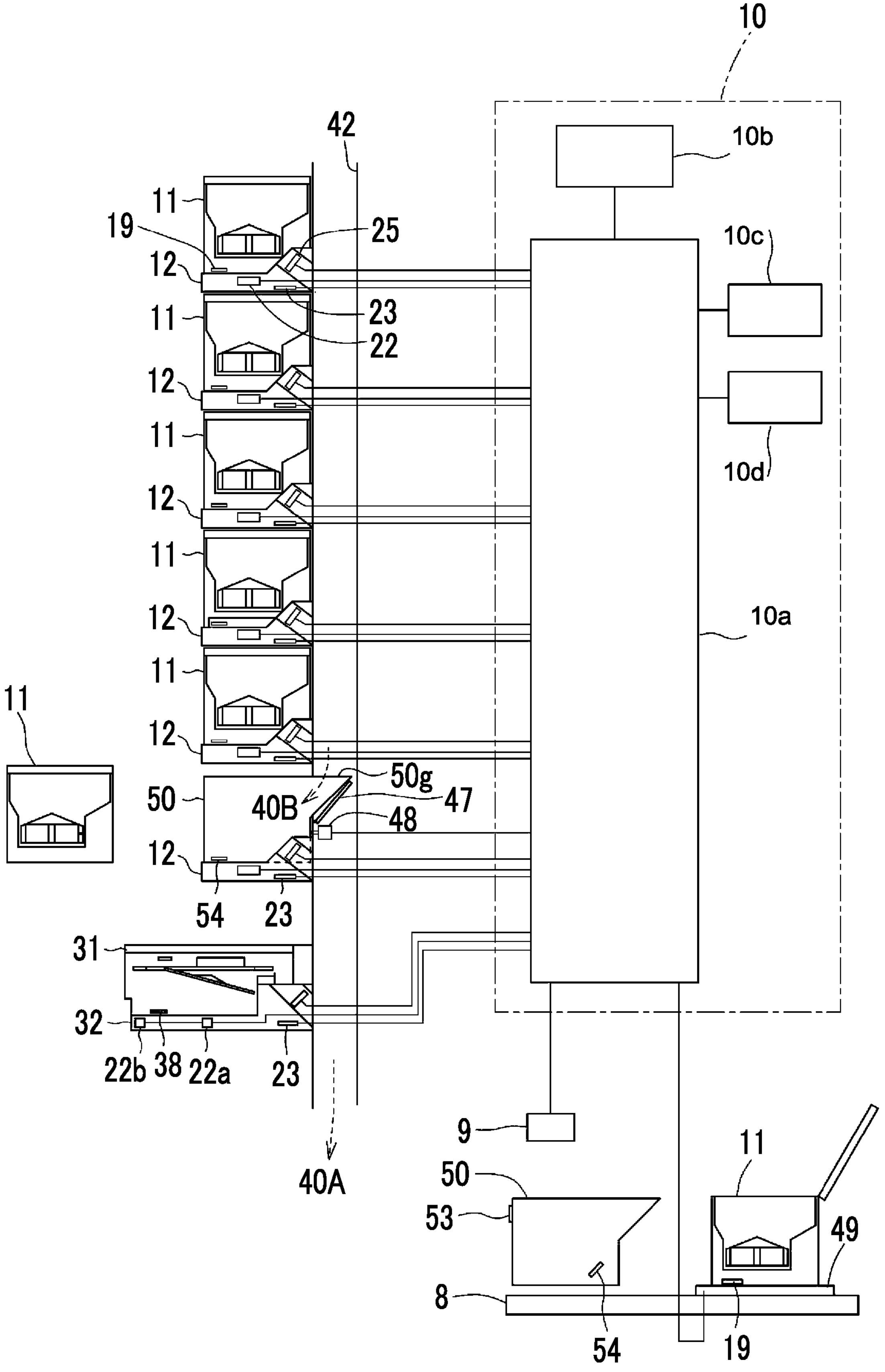
FIG. 5 is a block diagram of a control unit.

The tablet filling table 8 is provided on a front surface of the device body 20, and the tablet cassette 11, the universal cassette 31, and the tablet receptacle 50 can be placed thereon. As illustrated in FIG. 5, the tablet filling table 8 has an RFID reader/writer 49 as a reader. The RFID reader/writer 49 can read or rewrite the identification information of the tablet cassette 11 and the universal tablet cassette 31 which is written on the RFID tag 19 of the tablet cassette 11 and the RFID tag 38 of the universal tablet cassette 31, or the drug type identification information of the tablets accommodated in the tablet cassette 11 and the universal tablet cassette 31, and can write or rewrite a code number and a drug serving as a stocktaking object on the RFID tag 54 of the tablet receptacle 50.

The bar code reader 9 is provided on a front surface of the device body 20 above the tablet filling table 8, and can read a bar code 53 of the tablet receptacle 50 as a receptacle reader in addition to bar codes of drug cases and drug bottles.

The control unit 10 is a personal computer in an example in FIG. 1, but is not limited thereto. As illustrated in FIG. 5, the control unit 10 includes a control section 10*a*, a storage unit 10*b*, a display unit 10*c*, and an input unit 10*d* such as a keyboard. The control unit 10 performs a drug supply process for supplying the tablets and the powder medicine to a packaging unit 7, a drug packaging process for packaging the supplied drugs in units of a dosing time, and a stocktaking process for counting and stocktaking the tablets remaining in the tablet supply unit 4 by controlling the tablet supply unit 4, the powder medicine supply unit 5, and the manual distribution unit 6 in cooperation with the drive motor 22 provided in the mounting part 12 of the tablet cassette 11, the drive gears 22*a* and 22*b* provided in the mounting part 32 of the universal tablet cassette 31, the tablet detection sensor 25, the RFID reader/writer 23, the receptacle detection sensor 48, the bar code reader 9, and the RFID reader/writer 49.

Next, referring to FIGS. 6 to 10, the tablet receptacle 50 according to the first embodiment which is used during stocktaking of the drug dispensing device 1 will be described.

Figure 6:
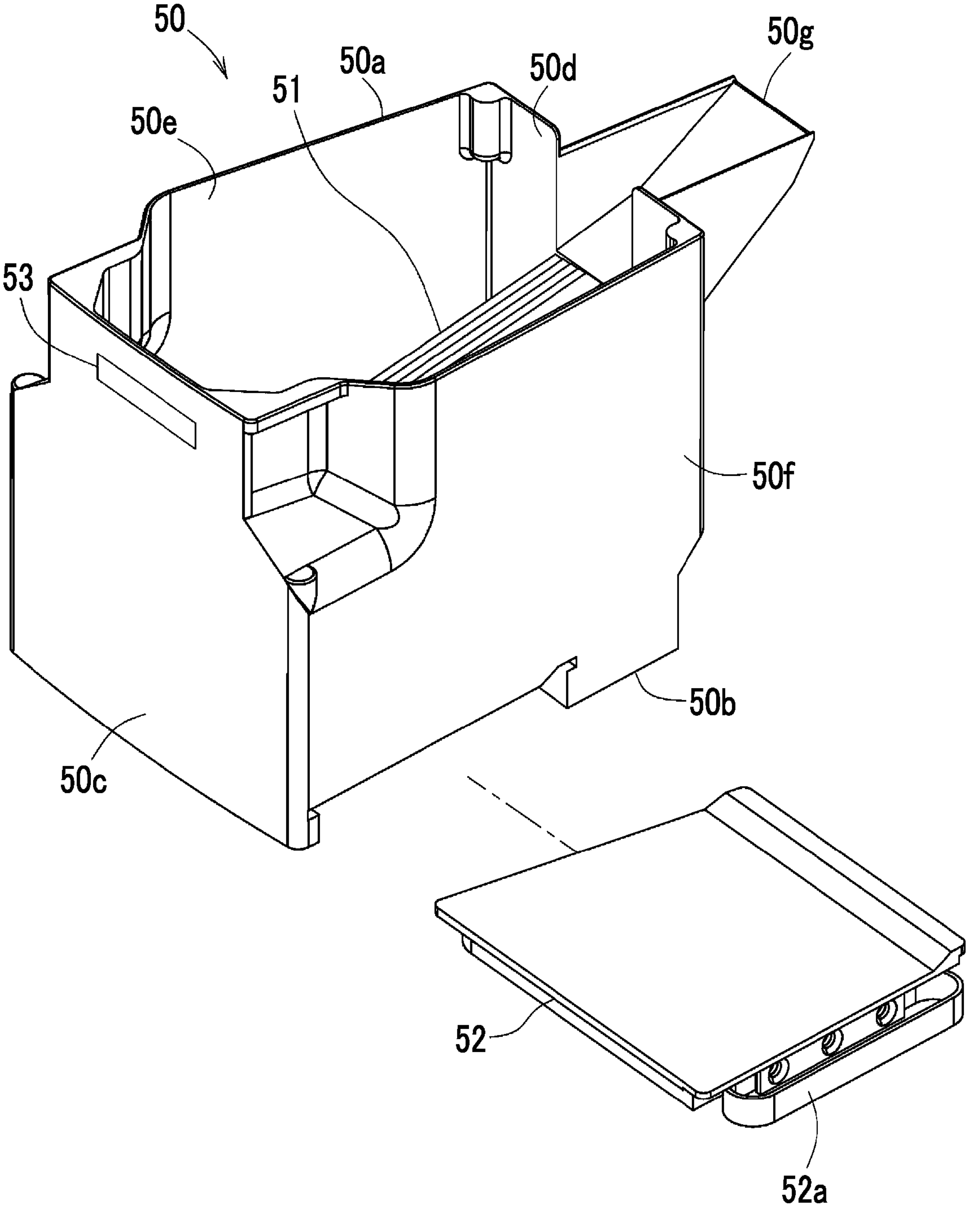
FIG. 6 is a perspective view of the tablet receptacle with the shutter pulled out, viewed obliquely from above.

As illustrated in FIG. 6, the tablet receptacle 50 is a substantially rectangular container having an upper opening portion 50*a*, and has a shape that can be mounted on the mounting part 12 in the same manner as the tablet cassette 11. That is, the tablet receptacle 50 is formed to be replaced with the tablet cassette 11 and mountable on the mounting part 12. The tablet receptacle 50 includes a bottom portion 50*b*, a front surface portion 50*c* located on a front side in a state of being mounted on the mounting part 12, a rear surface portion 50*d* located on a back side, and a left side surface portion 50*e* and a right side surface portion 50*f* which are located on the left and right sides, thereby forming an accommodation unit which can accommodate the tablets.

The rear surface portion 50*d* of the tablet receptacle 50 includes a receiving port 50*g* continuous with the opening portion 50*a*. The receiving port 50*g* is inserted into the tablet dropping passage 42 via the receptacle insertion port 44 of the device body 20, when the tablet receptacle 50 is installed in the mounting part 12. The width of the receiving port 50*g* is narrower than the width of the opening portion 50*a*, and has a dimension which can be inserted into the receptacle insertion port 44 of the wall portion 21 of the device body 20. However, the dimension is adopted so that the tablets do not enter a gap formed with an inner surface of the tablet dropping passage 42 when inserted into the receptacle insertion port 44. A protruding length of the receiving port 50*g* is smaller than a depth dimension of the tablet dropping passage 42. However, the dimension is adopted so that the tablets do not enter the gap formed with the inner surface of the tablet dropping passage 42, when inserted into the receptacle insertion port 44. A bottom portion 50*b* of the receiving port 50*g* is inclined downward from the tip of the receiving port 50*g* toward the opening portion 50*a*.

Figure 8:
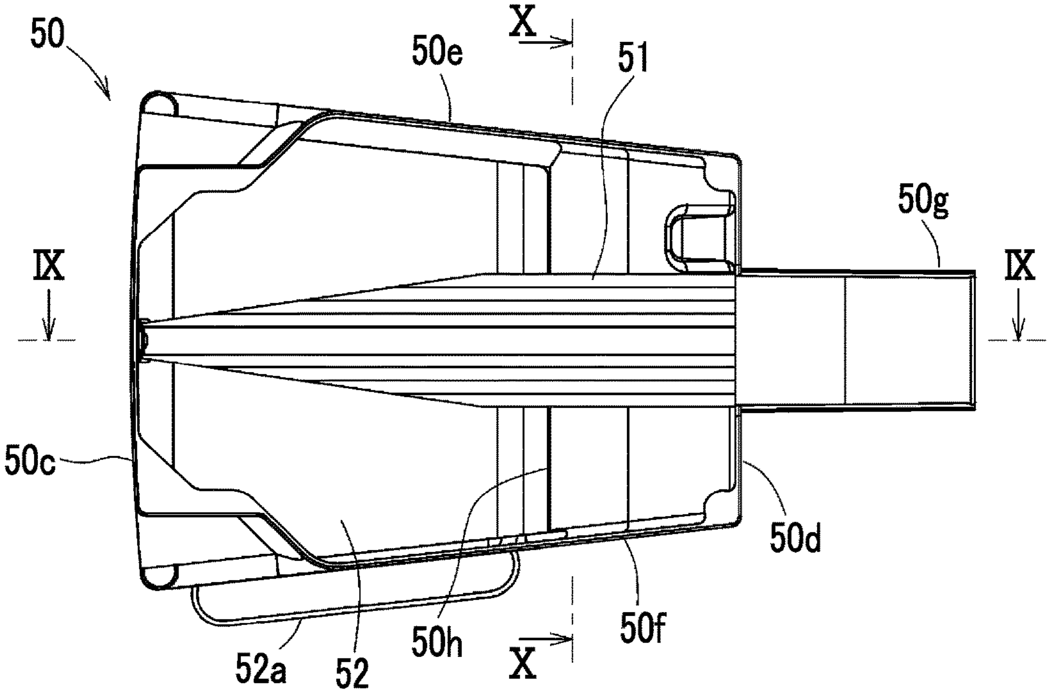
FIG. 8 is a plan view of the tablet receptacle.
Figure 9:
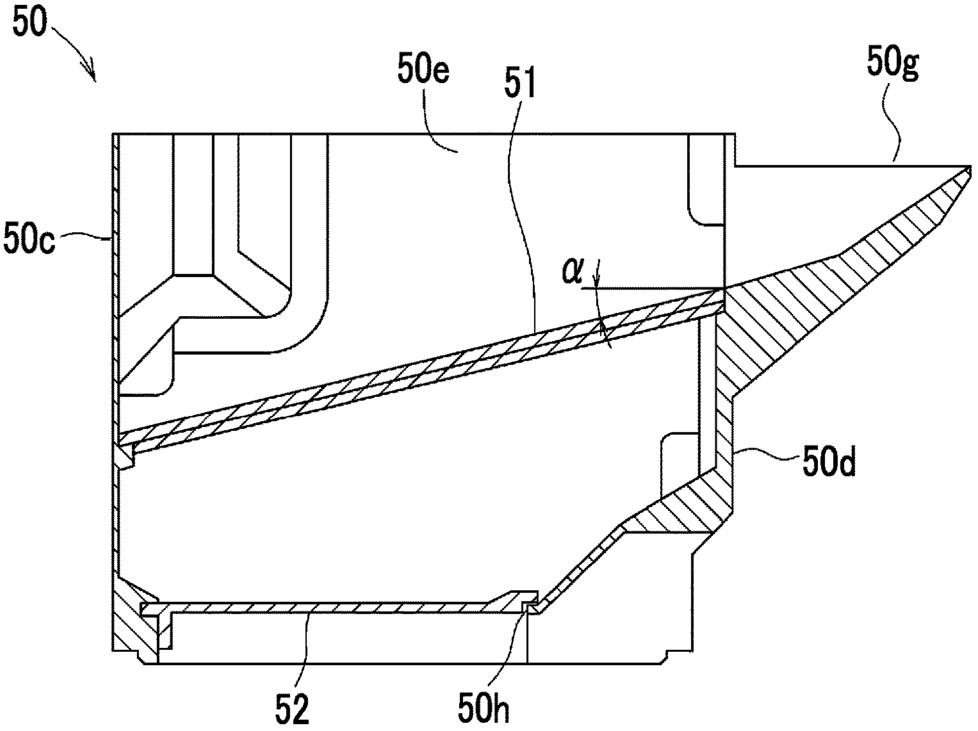
FIG. 9 is a cross-sectional view taken along line IX-IX of the tablet receptacle in FIG. 8.
Figure 10:
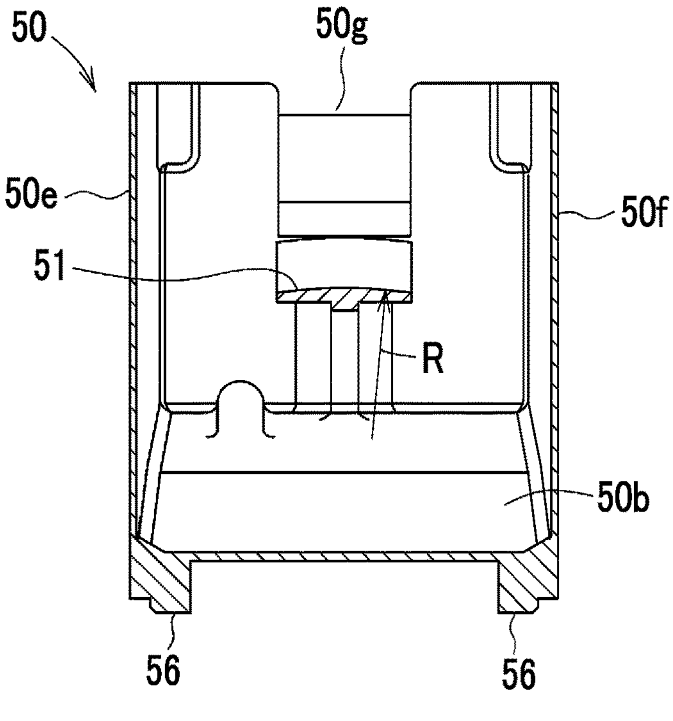
FIG. 10 is a cross-sectional view taken along line X-X of the tablet receptacle in FIG. 8.

As illustrated in FIG. 9, a tablet guide 51 inclined downward from the bottom portion of the receiving port 50*g* toward the inside of the tablet receptacle 50 at an angle α, 14.0 to 18.0 degrees, preferably 16.0 degrees, and extending to the front surface portion 50*c* is provided inside the tablet receptacle 50. As illustrated in FIG. 8, the tablet guide 51 is formed to be narrower from an intermediate portion toward the tip. As illustrated in FIG. 10, the tablet guide 51 is formed in a curved surface protruding upward to reduce a contact area with the tablets, preferably in an arc shape of a radius R (80 mm in an example), and is inclined downward toward both sides.

A bottom portion 50*b* of the tablet receptacle 50 has a dropping port 50*h*, and is provided with a shutter 52 for opening and closing the dropping port 50*h*. The shutter 52 can open the dropping port 50*h* by holding and pulling out a handle 52*a* from the right side surface portion 50*f*.

Figure 7:
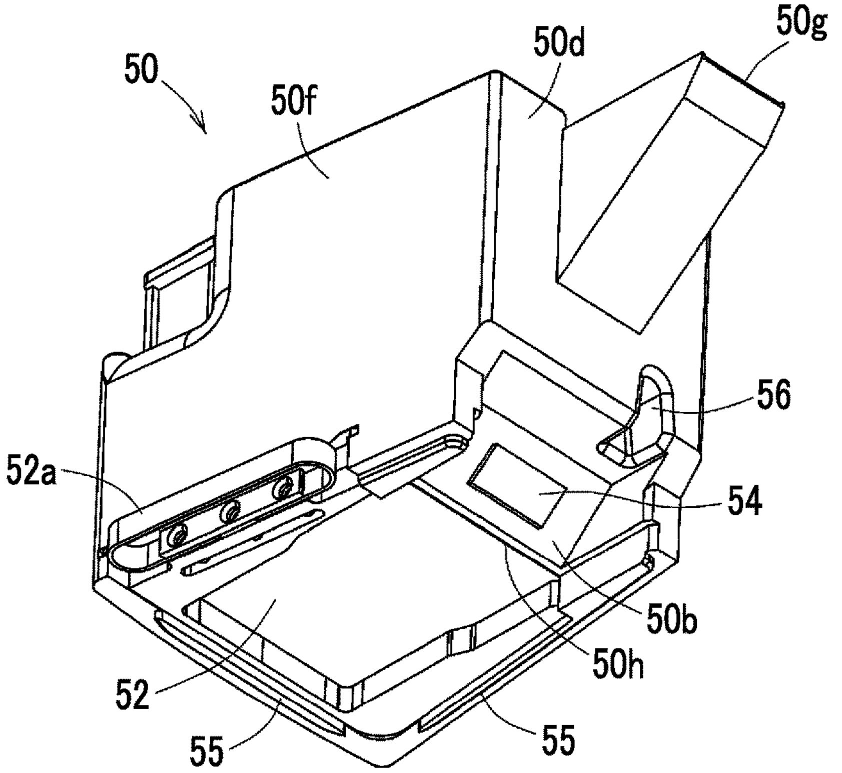
FIG. 7 is a perspective view when the tablet receptacle is obliquely viewed from below.

In the tablet receptacle 50, the bar code 53 illustrated in FIG. 6 is provided in the front surface portion 50*c*, and the RFID tag 54 illustrated in FIG. 7 is attached to the bottom portion 50*a*. At least one of a code number serving as the identification information of the tablet receptacle 50, the identification information of the tablet cassette 11, and the drug type identification information of the tablets accommodated in the tablet cassette 11 is recorded on the bar code 53. At least one of the identification information of the tablet receptacle 50, the drug type identification information of the tablets received by the tablet receptacle 50, or an address of the drug type identification information of the tablets received by the tablet receptacle 50 recorded in the storage unit 10*b* is written on the RFID tag 54.

As illustrated in FIG. 7, the bottom portion 50*a* of the tablet receptacle 50 is provided with a guide 55 for positioning in the opening portion of the tablet cassette 11. The rear surface portion 50*d* of the tablet receptacle 50 has an engagement portion 56 with which the detection rod 48*a* of the receptacle detection sensor 48 engages, when the tablet receptacle 50 is mounted on the mounting part 12.

When the tablet cassettes 11 are mounted on the mounting part 12, a tablet packaging passage 40A leading to the tablet discharge passage 24 of the mounting part 12, the tablet discharge port 41, the tablet dropping passage 42, and the packaging unit 7 from the tablet outlet 18 of each of the tablet cassettes 11 is formed. When the tablet receptacle 50 is installed in the mounting part 12 and the receiving port 50*g* is inserted into the tablet dropping passage 42 via the receptacle insertion port 44 of the device body 20, as illustrated in FIG. 2, a tablet receiving passage 40B leading to the tablet discharge passage 24 of the mounting table 12, the tablet discharge port 41, the tablet dropping passage 42, the receiving port 50*g* of the tablet receptacle 50, and the inside of the tablet receptacle 50 from the tablet outlet 18 of each of the tablet cassettes 11 is formed. The tablet receptacle 50 is replaced with the tablet cassette 11 and mounted on the mounting part 12. Therefore, there is no need to provide a special installation space. When the tablet receptacle 50 is installed in the mounting part 12, the receiving port 50*g* is inserted into the tablet dropping passage 42, and the tablet receiving passage 40B is formed. Therefore, there is no need to provide a special discharge passage.

The tablet receptacle 50 illustrated in FIGS. 6 to 10 is a dedicated container used for a stocktaking process, but the receiving port may be attached to the existing tablet cassette 11. According to this configuration, the tablet receptacle can be used only by providing the receiving port in the tablet cassette 11. Therefore, the tablet receptacle can be mounted on the mounting part 12 in the same manner as the tablet cassette 11, and there is no need to prepare a special tablet receptacle.

Next, a stocktaking process and an operation of the drug dispensing device 1 will be described.

In the drug dispensing device 1 according to the present embodiment, stocktaking can be performed by using a tablet counting function of the drug dispensing device 1 without transferring the tablets in the tablet cassette 11 to a tablet counter.

Figure 13:
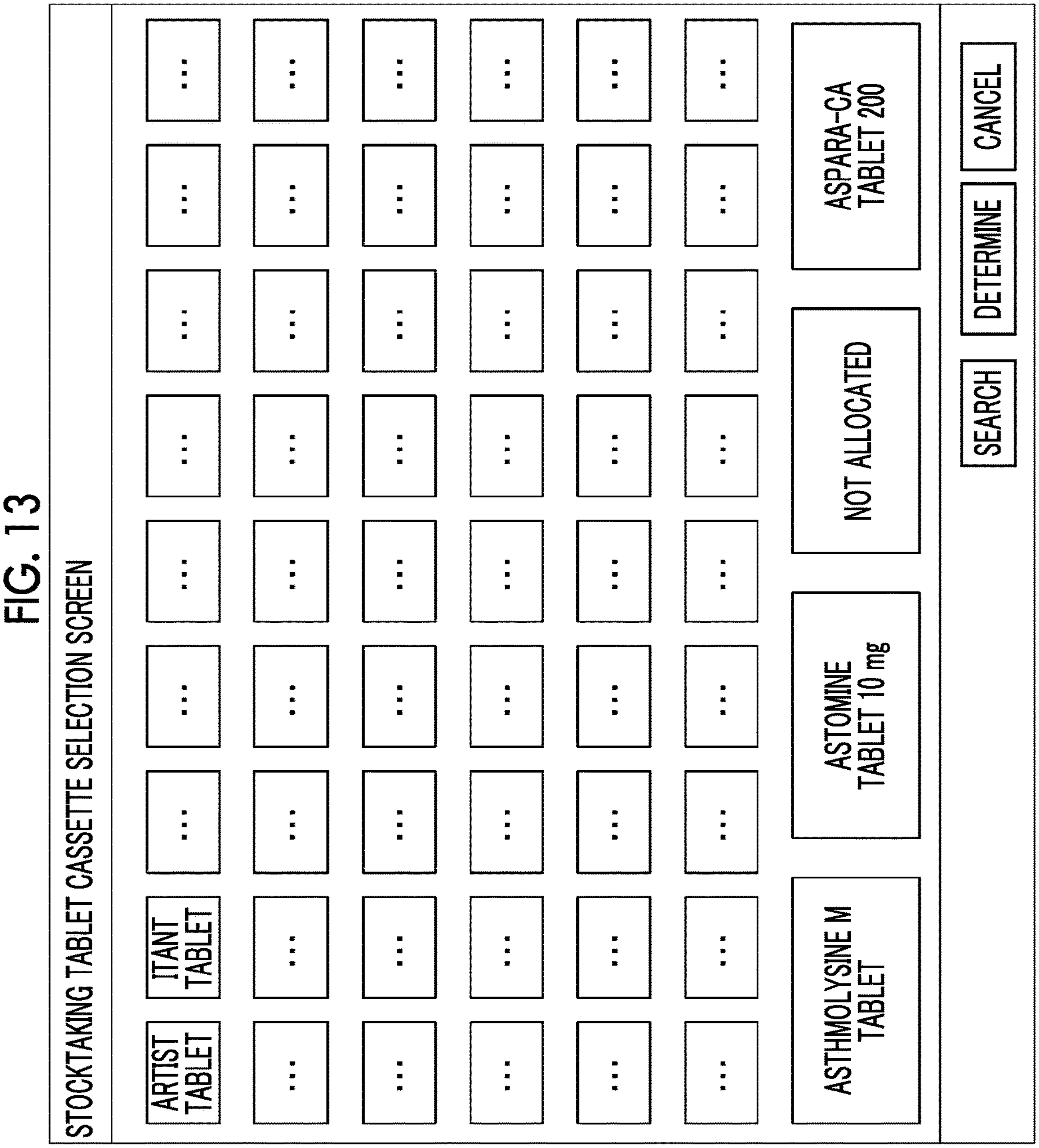
FIG. 13 is a view illustrating a screen for selecting a tablet cassette serving as a stocktaking object displayed on a display unit of the control unit.

First, a user installs the tablet receptacle 50 on the tablet filling table 8, and turns on a stocktaking key displayed on the display unit 10*c* of the control unit 10. Thereafter, the user looks at a stocktaking tablet cassette selection screen as illustrated in FIG. 13, and selects the tablet cassette 11 serving as the stocktaking object. In this case, any one of each row, for example, an uppermost tablet cassette may be selected, or all tablet cassettes in each row may be selected. The identification information (code number) of the selected tablet cassette 11 serving as the stocktaking object and the drug type identification information of the tablets accommodated in the tablet cassette 11 are stored in the storage unit 10*b* in advance.

Figure 11:
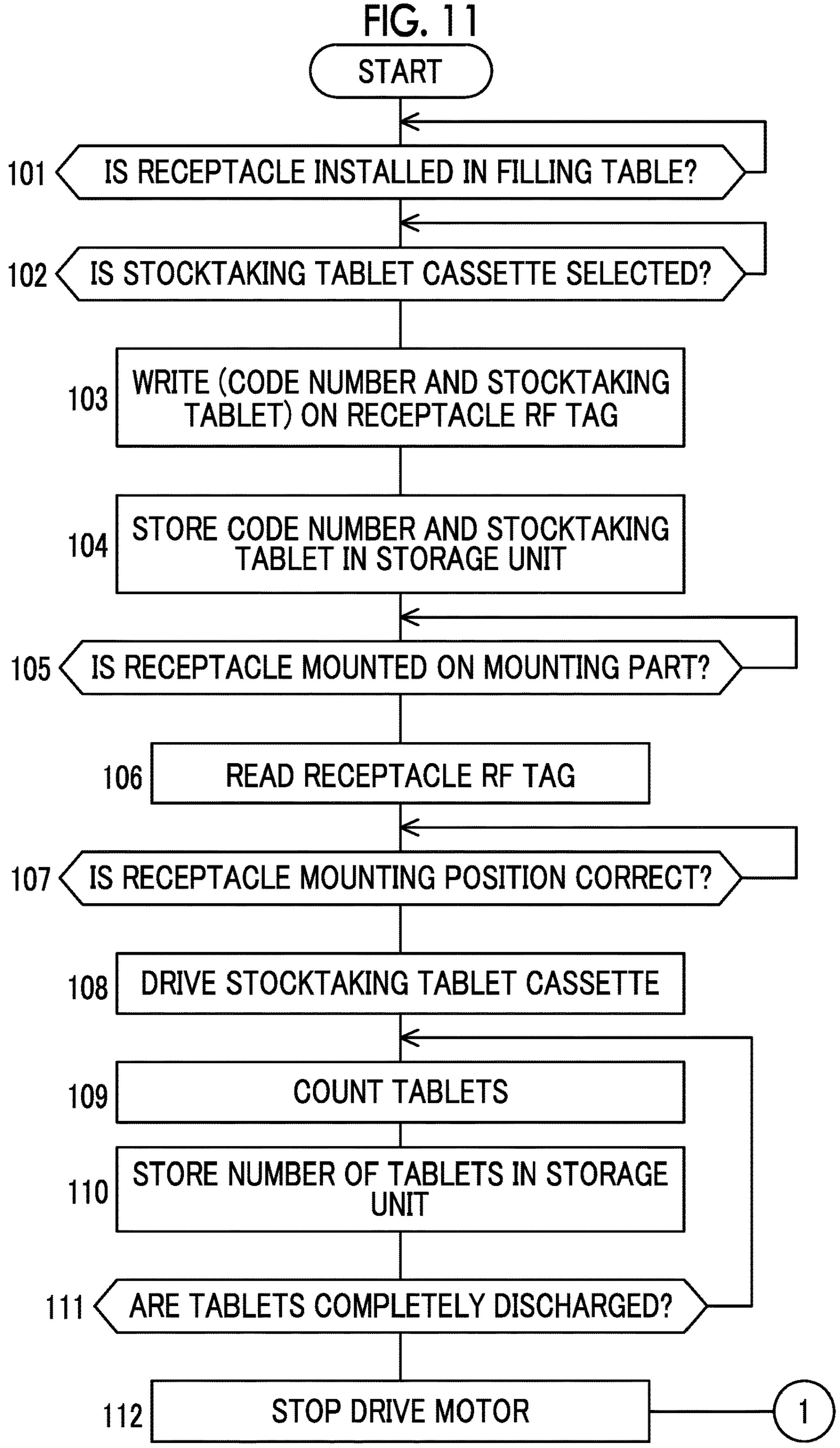
FIG. 11 is a flowchart of a stocktaking process performed by a control section.

The control section 10*a* of the control unit 10 causes the RFID reader/writer 49 to read the RFID tag 54 of the tablet receptacle 50 placed on the tablet filling table 8 in Step 101 illustrated in FIG. 11. The RFID reader/writer 49 reads the identification information (code number) of the tablet receptacle 50 which is written on the RFID tag 54. In this manner, the control section 10*a* determines whether or not the tablet receptacle is placed on the tablet filling table 8. When the control section 10*a* determines that the tablet cassette 11 serving as the stocktaking object is selected in Step 102, the control section 10*a* associates the code number of the tablet receptacle 50 with the drug type identification information of the stocktaking drug accommodated in the tablet cassette 11 serving as the stocktaking object, and writes the associated drug type identification information on the RFID tag 54 of the tablet receptacle 50 in Step 103. In Step 104, the code number of the tablet receptacle 50 and the drug type identification information of the stocktaking drug are associated and stored in the storage unit 10*b*.

Next, the user detaches the tablet cassette 11 mounted on a lowermost mounting part 12 in a row of the selected tablet cassettes 11 serving as the stocktaking object, and replaces the tablet cassette 11 with the tablet receptacle 50. In this case, the receiving port 50*g* of the tablet receptacle 50 presses the movable plate 47 from the receptacle insertion port 44 of the device body 20, and enters the tablet dropping passage 42. In this manner, the tablet receiving passage 40B is formed from the tablet outlet 18 of each of the tablet cassettes 11 to the tablet discharge passage 24 of the mounting table 12, the tablet discharge port 41, the tablet dropping passage 42, the receiving port 50*g* of the tablet receptacle 50, and the inside of the tablet receptacle 50. Therefore, the tablets of each of the tablet cassettes 11 can be received by the tablet receptacle 50.

When the control section 10*a* of the control unit 10 determines in Step 105 that the tablet receptacle 50 is mounted, based on a signal from the receptacle detection sensor 48 of the device body 20, the control section 10*a* causes the RFID reader/writer 23 to read the code number of the RFID tag 54 of the tablet receptacle 50 mounted on the mounting part 12 in Step 106. Depending on whether or not the drug type identification information associated with the code number in Step 107 and the drug type identification information of the stocktaking drug accommodated in the tablet cassette 11 serving as the stocktaking object coincide with each other, the control section 10*a* determines whether or not the tablet receptacle 50 in the row of the tablet cassettes 11 serving as the stocktaking object is correctly mounted.

When it is determined that the tablet receptacle 50 is correctly mounted, the control section 10*a* of the control unit 10 shifts to a tablet counting mode. In the tablet counting mode, in Step 108, the drive motor 22 of the mounting part 12 on which the tablet cassette 11 serving as the stocktaking object is mounted is driven to discharge the tablets from the tablet outlet 18 of the tablet cassette 11 serving as the stocktaking object. In Step 109, based on a signal from the tablet detection sensor 25, the tablets discharged from the tablet outlet 18 are detected, and the number of the tablets is stored in the storage unit 10*b* in Step 110.

In order to prevent clogging of the tablets discharged from the tablet cassette 11, the following process can be performed. (1) The rotor 16 is reversely rotated when a tablet dispensing operation of the rotor 16 starts, and thereafter, the operation shifts to a normal dispensing operation, (2) the rotor 16 is reversely rotated when it is detected that a prescribed number of the tablets such as two tablets is discharged, (3) the rotor 16 is reversely rotated when a drive shaft of the drive motor 22 rotates by a prescribed angle, (4) a detector such as a magnet is provided in the rotor 16, and the rotor 16 is reversely rotated when the rotor 16 rotates by a prescribed angle.

The tablets discharged from the tablet outlet 18 of the tablet cassette 11 serving as the stocktaking object pass through the tablet discharge passage 24 of the mounting part 12, and are dropped along the tablet dropping passage 42. Thereafter, the tablets enter the tablet receptacle 50 from the receiving port 50*g* of the tablet receptacle 50. The tablets entering the tablet receptacle 50 slide down along the tablet guide 51. The tablet guide 51 is formed to be narrower from the intermediate portion to the tip, and is inclined downward toward both sides. Therefore, the tablets sliding down along the tablet guide 51 are dropped to both sides, and are uniformly accumulated in the bottom portion 50*a* of the tablet receptacle 50.

When the control section 10*a* of the control unit 10 determines in Step 111 that the tablets are completely discharged, based on a signal from the tablet detection sensor 25, in Step 112, the control section 10*a* stops the drive motor 22 of the mounting part 12 on which the tablet cassette 11 serving as the stocktaking object is mounted. Whether or not the tablets are completely discharged can be determined (1) by detecting that the rotor 16 or the drive motor 22 is rotated for a prescribed period of time without turning on the tablet detection sensor 25, or (2) by detecting that the rotor 16 or the drive motor 22 is rotated at a prescribed angle without turning on the tablet detection sensor 25.

When the tablets are completely discharged from the tablet cassette 11 serving as the stocktaking object, the user detaches the tablet cassette 11 serving as the stocktaking object from the mounting part 12, and installs the tablet cassette 11 on the tablet filling table 8. Thereafter, the user detaches the tablet receptacle 50 from the mounting part 12, and places the bar code 53 of the tablet receptacle 50 over the bar code reader 9.

Figure 12:
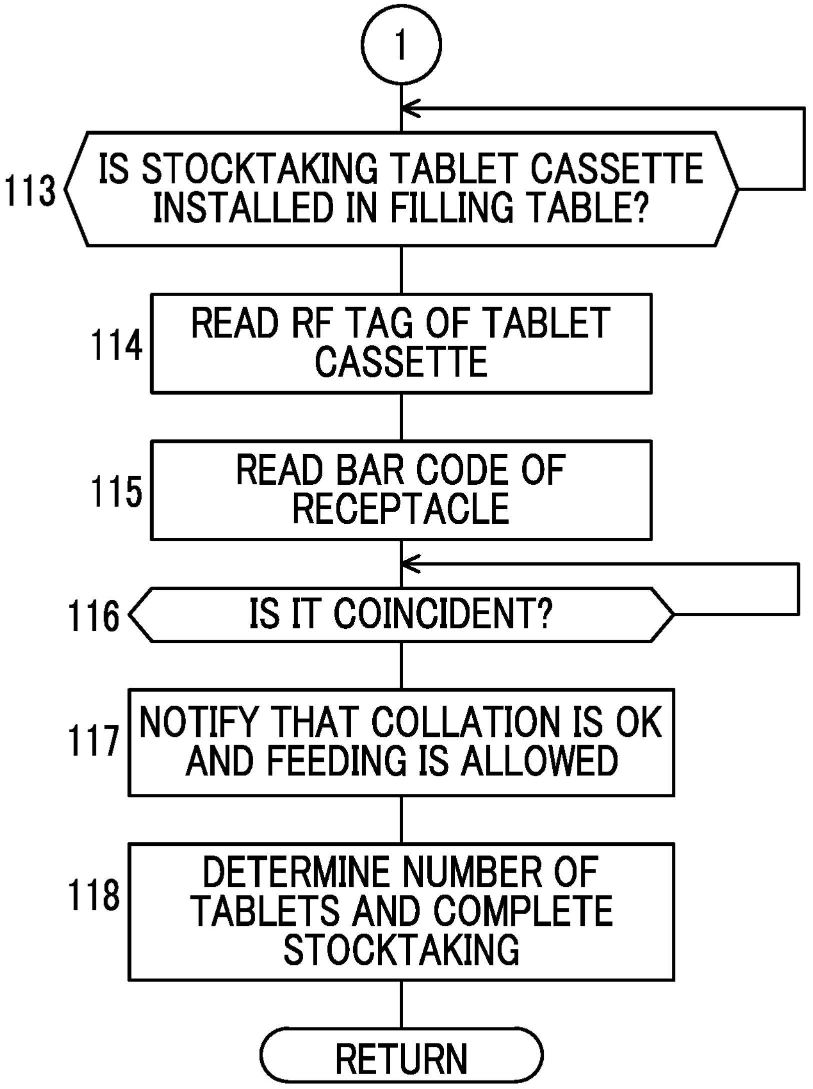
FIG. 12 is a flowchart of a stocktaking process performed by the control section, subsequently to FIG. 11.

In Step 113 illustrated in FIG. 12, the control section 10*a* of the control unit 10 causes the RFID reader/writer 49 to read the RFID tag 19 of the tablet cassette 11 placed on the tablet filling table 8, and determines whether or not the tablet cassette 11 serving as the stocktaking object is placed on the tablet filling table 8. In Step 114, the drug type identification information of the RFID tag 19 of the tablet cassette 11 serving as the stocktaking object is read to recognize the drug serving as the stocktaking object. In Step 115, based on a signal from the bar code reader 9, the control section 10*a* recognizes the code number of the tablet receptacle 50 which is written on the bar code 53 of the tablet receptacle 50. In Step 116, the control section 10*a* of the control unit 10 collates whether or not the drug type identification information of the tablet cassette 11 serving as the stocktaking object stored in the storage unit 10*b* coincides with the drug type identification information associated with the code number of the tablet receptacle 50 which is read by the bar code reader 9. In Step 117, the control section 10*a* causes the display unit 10*c* to display that the collation is OK and feeding is allowed to inform the user of a result. In Step 118, the tablets and the number of the tablets are determined. The process returns to Step 101, and shifts to a stocktaking process for the subsequent stocktaking object.

When the collation is OK, the user feeds the tablets in the tablet receptacle 50 into the tablet cassette 11 serving as the stocktaking object, and causes the tablets to return to the tablet cassette 11. In this case, the tablet receptacle 50 receiving the tablets is placed on the tablet cassette 11, and the shutter 52 is pulled out to open the dropping port 50*h*. In this manner, the tablets can quickly return to the tablet cassette 11 at once without any left tablet. The tablet receptacle 50 has the guide 55 engaging with the opening portion of the tablet cassette 11. Therefore, tablet receptacle 50 is reliably placed on the tablet cassette 11 without being inclined or deviated, and there is no possibility that the tablets may be scattered. Subsequently, the user mounts the tablet cassette 11 to which the tablets return from the tablet receptacle 50 on the mounting table 12, completes the stocktaking of the tablet cassette 11 serving as the first stocktaking object, and starts to perform the stocktaking of the tablet cassette 11 serving as the stocktaking object in the same procedure.

When the tablet cassettes 11 in all stages are selected as the tablet cassettes 11 serving as the stocktaking object, the stocktaking process for the subsequent stocktaking object starts by only causing the tablet receptacle 50 to return to the mounting table 12. The tablet cassette 11 detached by being first replaced with the tablet receptacle 50 is replaced with one of the tablet cassettes 11 whose stocktaking processes are completed, and is mounted on the mounting table 12. In this manner, the stocktaking process can be performed.

In order to distinguish between the completely counted tablets and the uncounted tablets, it is preferable to change a color of a display portion of the completely counted tablets on a stocktaking tablet cassette selection screen in FIG. 13. In this manner, the completely counted tablets and the uncounted tablets can be clearly distinguished, and thus, a stocktaking error or rework can be prevented. In addition, during counting, the tablets may be displayed by means of blinking.

In addition, when the tablet receptacle 50 is mounted on the lowermost mounting part 12, counting may start by automatically dispensing the tablets discharged from the tablet cassette 11 accommodating the uncounted tablets in the same row.

The collation between the tablet receptacle and the tablet cassette is not limited to the above-described example, and various methods can be adopted.

For example, in the above-described embodiment, the bar code 53 is provided in the tablet receptacle 50, but the bar code 53 may not be provided. In this case, after the code number is read by placing the tablet receptacle 50 on the tablet filling table 8, the tablet cassette 11 is installed by being replaced with the tablet receptacle 50, and the drug type identification information is read. The drug type identification information associated with the code number is searched for in the storage unit 10*b*, and both the drug type identification information are collated. When two of the RFID reader/writer 49 are provided for the tablet receptacle 50 and the tablet cassette 11, there is no need to replace both of these.

Conversely, the tablet receptacle 50 may be provided with only the bar code 53 having the recorded code number without providing the RFID tag, and the tablet cassette 11 may also be provided with only the bar code 53. In this case, the code number of the bar code 53 of the tablet receptacle 50 and the drug type identification information of the tablet cassette 11 serving as the stocktaking object are associated with each other, and are stored in the storage unit 10*b*. The drug type identification information searched for from the code number of the tablet receptacle 50 is collated with the drug type identification information of the bar code 53 of the tablet cassette 11.

In addition, the tablet receptacle 50 can be dedicated to a specific drug type, and the drug type identification information can be written on the RFID tag 54 or the bar code 53. In this case, a plurality of the drug type identification information may be written on the RFID tag 54 or the bar code 53 of the tablet receptacle 50, and specific drug type identification information may be selected for each stocktaking from the plurality of drug type identification information.

Furthermore, the tablet receptacle 50 can be dedicated to a specific tablet cassette, and tablet cassette identification information can be written on the RFID tag 54 or the bar code 53. In this case, a plurality of the tablet cassette identification information may be written on the RFID tag 54 or the bar code 53 of the tablet receptacle 50, and specific tablet cassette identification information may be selected for each stocktaking from the plurality of tablet cassette identification information.

As described above, in the drug dispensing device 1 according to the present embodiment, the tablet receiving passage 40B is formed only by mounting the tablet receptacle 50 at a predetermined position, and the stocktaking process can be performed by using the tablet counting function of the drug dispensing device 1 itself. Therefore, there is no need to separately provide a tablet counting device or to secure an installation space thereof.

In addition, the drug dispensing device 1 according to the present embodiment is configured as follows. When the tablet cassette 11 is mounted on the mounting part 12, the tablets are discharged to the tablet dropping passage 42 from the tablet cassette 11. When the tablet receptacle 50 is mounted on the mounting part 12, the tablets discharged to the tablet dropping passage 42 from the tablet cassette 11 mounted on the mounting part 12 located above the mounting part 12 are received by the tablet receptacle 50. Therefore, in the same mounting part 12, the tablets can be packaged by being dispensed from tablet cassette 11, and the tablets from tablet cassette 11 can be received by the tablet receptacle 50.

In addition, when the tablet receptacle 50 is mounted on the mounting part 12, a discharge destination of the tablets discharged to the tablet dropping passage 42 from the tablet cassette 11 mounted on the mounting part 12 located above the mounting part 12 is switched from the packaging unit 7 to the tablet receptacle 50. Therefore, there is no need to provide a special passage or a special space for receiving the tablets in the tablet receptacle 50.

When the receptacle detection sensor 48 detects that the tablet receptacle 50 is mounted on the mounting part 12, the discharge destination of the tablets discharged to the tablet dropping passage 42 is configured to be switched from the packaging unit 7 to the tablet receptacle 50. Therefore, the tablet packaging passage 40A can be switched to the tablet receiving passage 40B only by mounting the tablet receptacle 50, and there is no need to provide a special device for switching the passages.

In the embodiment of the stocktaking process and the operation of the drug dispensing device 1 described above, the stocktaking tablet cassette selection screen is displayed by turning on the stocktaking key. However, the selection screen of the tablet cassette serving as the stocktaking object may be displayed by detecting that the tablet receptacle 50 is mounted on the mounting part 12. In this case, when only the tablet cassette 11 disposed in the mounted row is displayed, the tablet cassette 11 can be efficiently selected.

In addition, in the above-described embodiment, the code number of the tablet receptacle 50 and the drug type identification information of the stocktaking drug accommodated in the tablet cassette 11 serving as the stocktaking object are written on the RFID tag 54 of the tablet receptacle 50. However, both may not be written. The identification information (code information) of the tablet receptacle 50 can be read by the RFID reader/writer 49, and the stocktaking tablets and the code information can be associated with each other, and can be stored in the storage unit 10*b*.

Figure 14:
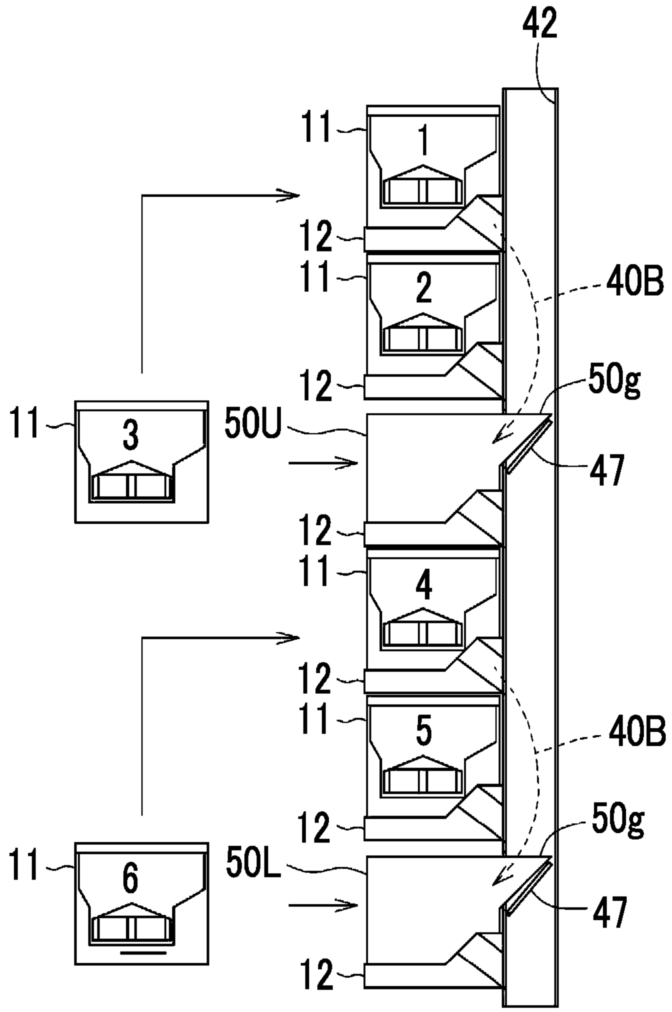
FIG. 14 is a view illustrating a disposition of the tablet receptacles in stocktaking processes simultaneously performed in a plurality of stages.

As illustrated in FIG. 14, the drug dispensing device 1 according to the above-described embodiment can simultaneously perform the stocktaking process on the tablet cassettes 11 in a plurality of stages in the same row. In an example in FIG. 14, the tablet cassettes 11 in the third stage and the sixth stage are detached, and a first tablet receptacle 50U and a second tablet receptacle 50L are respectively mounted. The first tablet receptacle 50U sequentially performs the stocktaking processes of the tablets in the tablet cassettes from the first stage to the third stage, and the second tablet receptacle 50L sequentially performs the stocktaking processes of the tablets in the tablet cassettes from the fourth stage to the sixth stage. That is, the tablets are discharged from the tablet cassette 11 in the first stage to the first tablet receptacle 50U in the third stage. The tablets are discharged from the tablet cassette 11 in the fourth stage to the second tablet receptacle 50L in the sixth stage. In this manner, the stocktaking processes of the tablet cassettes 11 in the first stage and the fourth stage are performed. Subsequently, the tablets are discharged from the tablet cassette 11 in the second stage to the first tablet receptacle 50U in the third stage. The tablets are discharged from the tablet cassette 11 in the fifth stage to the second tablet receptacle 50L in the sixth stage. In this manner, the stocktaking processes of the tablet cassettes 11 in the second stage and the fifth stage are performed. Furthermore, the detached tablet cassette 11 in the third stage is mounted on the first stage (replaced with the tablet cassette 11 in the first stage), and the tablets are discharged to the first tablet receptacle 50U in the third stage. Similarly, the detached tablet cassette 11 in the sixth stage is mounted on the fourth stage (replaced with the tablet cassette 11 in the fourth stage), and the tablets are discharged to the second tablet receptacle 50L in the sixth stage. In this manner, the stocktaking processes are performed in the tablet cassettes 11 in the third stage and the sixth stage. In this manner, stocktaking work can be quickly carried out. Mounting positions of the first tablet receptacle 50U and the second tablet receptacle 50L are not limited to the third stage and the sixth stage as described above.

Figure 15:
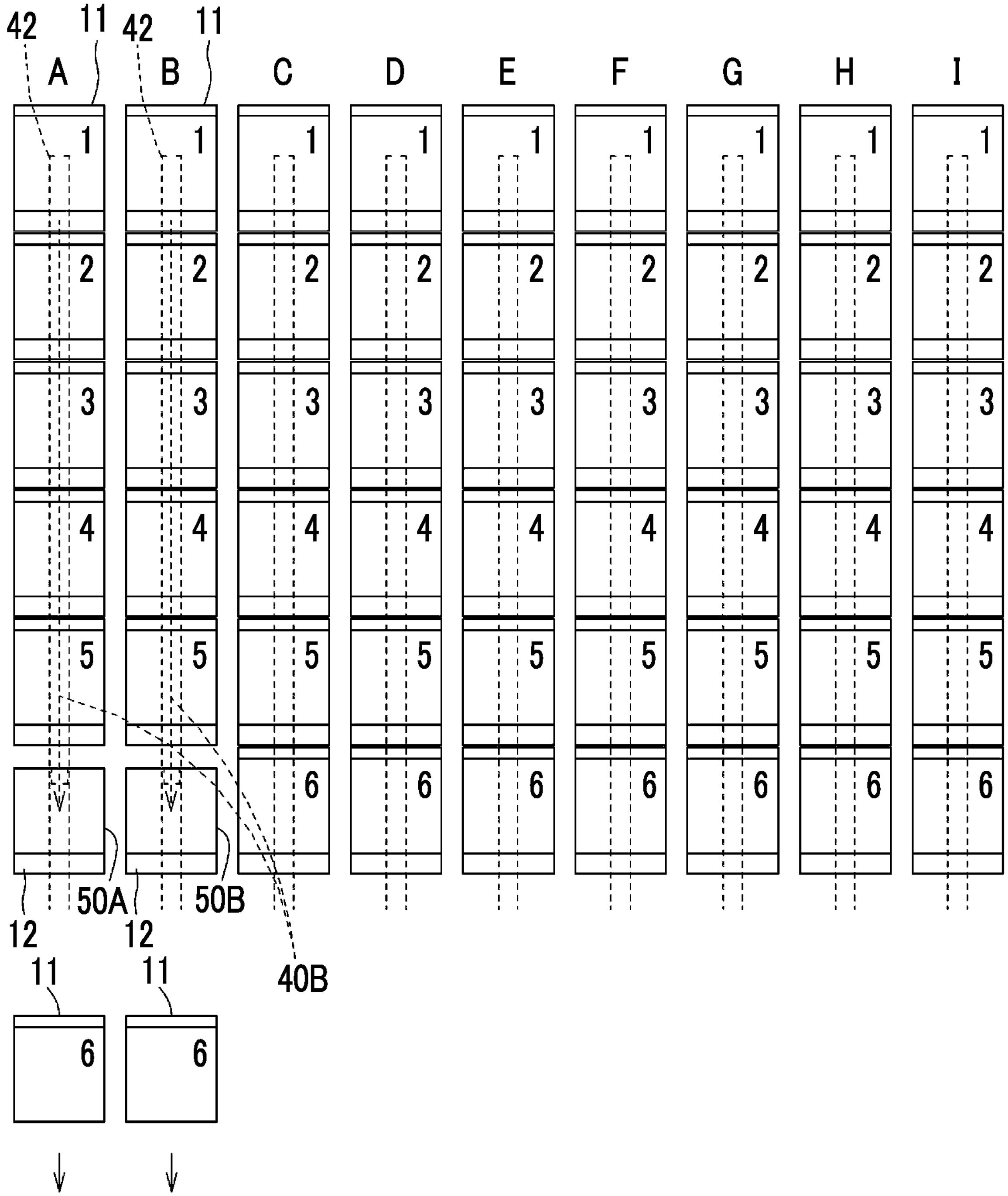
FIG. 15 is a view illustrating a disposition of the tablet receptacles in stocktaking processes simultaneously performed in a plurality of rows.

In addition, as illustrated in FIG. 15, the stocktaking processes can be simultaneously performed in the tablet cassettes 11 in a plurality of rows. In an example in FIG. 15, the tablet cassettes 11 in the sixth stage in a row A and a row B are detached, and the first tablet receptacle 50A and the second tablet receptacle 50B are respectively mounted. The first tablet receptacle 50A sequentially performs the stocktaking processes of the tablets in the tablet cassettes 11 from the first stage to the sixth stage in the row A, and the second tablet receptacle 50B sequentially performs the stocktaking processes of the tablets in the tablet cassettes 11 from the first stage to the sixth stage in the row B.

That is, the tablets are discharged to the tablet receptacle 50A in sixth stage from the tablet cassette 11 in the first stage in the row A, and the tablets are discharged to the tablet receptacle 50B in the sixth stage from the tablet cassette 11 in the first stage in the row B. In this manner, the stocktaking processes are performed in the tablet cassettes 11 in the first stages in row A and the row B. Subsequently, the tablets are discharged to the tablet receptacle 50A in the sixth stage from the tablet cassette 11 in the second stage in the row A, and the tablets are discharged to the tablet receptacle 50B in the sixth stage from the tablet cassette 11 in the second stage in the row B. In this manner, the stocktaking processes are performed in the tablet cassettes 11 in the second stage in the A row and the B row. This operation is repeated up to the fifth stage. Next, the detached tablet cassette 11 in the sixth stage is mounted on the first stage (replaced with the tablet cassette 11 in the first stage), and the tablets are discharged to the tablet receptacle 50A in the sixth stage. The detached tablet cassette 11 in the sixth stage is mounted on the first stage (replaced with the tablet cassette 11 in the first stage), and the tablets are discharged to the tablet receptacle 50B in the sixth stage. In this manner, the stocktaking processes are performed in the tablet cassettes 11 in the sixth stages of the row A and the row B. Similarly, the stocktaking processes are performed in the tablet cassettes in the row B and the row C, and this operation is repeated to perform the stocktaking processes in the tablet cassettes from the row A to the row I. In this manner, stocktaking work can be quickly carried out. The number and an order of the rows in which the stocktaking processes are simultaneously performed are not limited to the above-described example.

Next, a tablet receptacle 60 according to a second embodiment will be described.

The tablet receptacle 60 according to the second embodiment is substantially the same as the tablet receptacle 50 according to the first embodiment, except that a receiving port movable mechanism and a vibration mechanism are provided. Therefore, the same reference numerals will be assigned to the corresponding elements, and description thereof will be omitted.

<Movable Mechanism of Receiving Port>

In FIG. 2, when the bottom of the receiving port 50*g* of the tablet receptacle 50 is gently inclined, the tablets dispensed from the tablet cassette 11 and colliding with the bottom of the receiving port 50*g* do not vigorously enter the inside of the tablet receptacle 50. Therefore, there is a possibility that the entrance of the tablet receptacle 50 may be clogged with the tablets. Therefore, it is preferable that the receiving port 50*g* of the tablet receptacle 50 is movable to have a steep inclination angle of the bottom of the receiving port 50*g* when the tablets are received.

Figure 16:
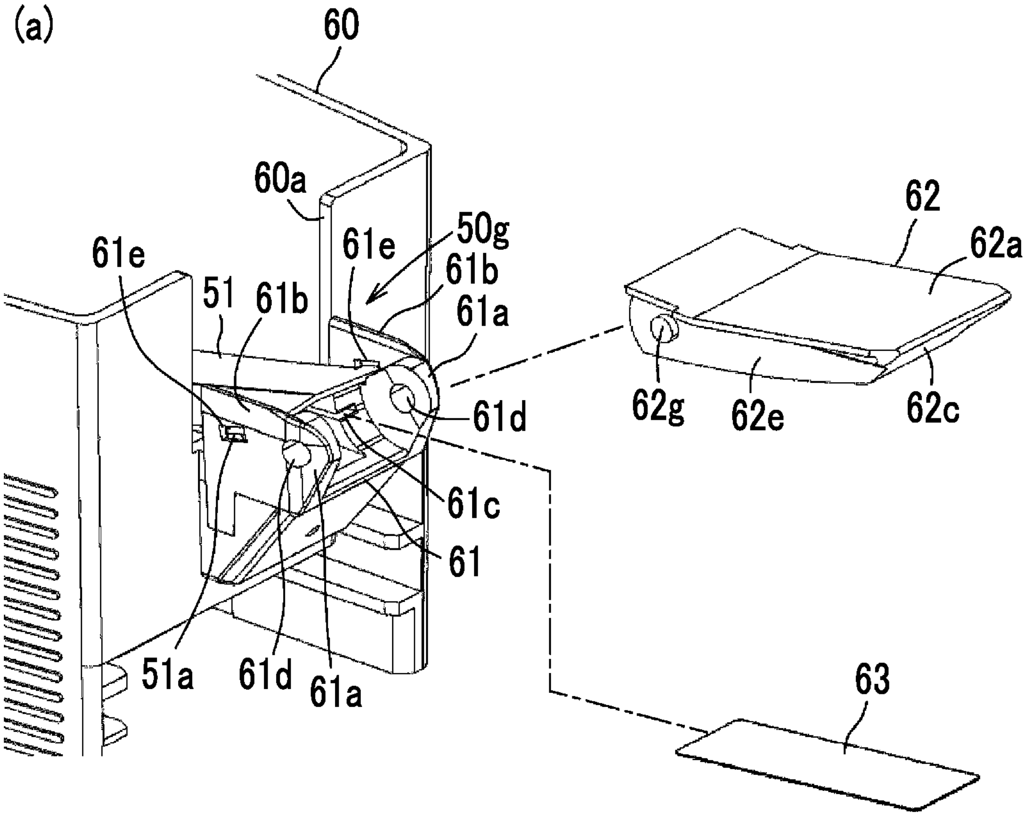
FIG. 16 is an exploded perspective view illustrating a movable mechanism of a receiving port of a tablet receptacle according to a second embodiment.
Figure 16:
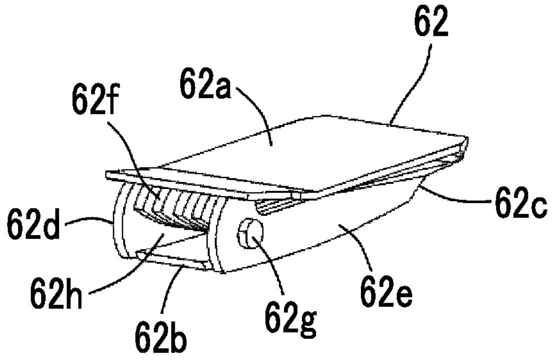

FIG. 16 illustrates the tablet receptacle 60 including the receiving port 50*g* having a movable mechanism. The movable mechanism of the receiving port 50*g* is configured to include a support portion 61, a receiving plate 62 supported to be pivotable by the support portion 61, and a leaf spring 63.

The support portion 61 is attached to a lower edge of a rectangular cutout 60*a* formed in the rear surface portion of the tablet receptacle 60, and has a pair of bearing portions 61*a* on both side ends and a rising piece 61*b* rising along both side edges of the cutout. The support portion 61 has a groove 61*c* into which one end of the leaf spring 63 (to be described later) is inserted and supported. A shaft hole 61*d* is formed in the bearing portion 61*a*. The rising piece 61*b* has a support hole 61*e* with which a support protrusion 51*a* on one end side of the tablet guide 51 engages.

The receiving plate 62 is configured to include an upper portion 62*a*, a lower portion 62*b*, a tip portion 62*c*, both side portions 62*d* and 62*e*, and a plurality of ribs 62*f* extending from the inner surface of the upper portion 62*a* to the tip portion 62*c*, and has a rectangular shape when viewed from above. A shaft portion 62*g* protruding outward is formed in one end of both side portions 62*d* and 62*e*. A gap 62*h* into which the leaf spring 63 (to be described later) is inserted is formed between the rib 62*f* and the lower portion 62*b*. The shaft portion 62*g* is fitted into the shaft hole 61*d* of the support portion 61 so that the receiving plate 62 is pivotable around the shaft portion 62*g*.

The leaf spring 63 holds the receiving plate 62 in a substantially horizontal state where one end is supported by the groove 61*c* of the support portion 61 and the other end is supported by being inserted into the gap 62*h* of the receiving plate 62. In addition, the leaf spring 63 biases the receiving plate 62 downward when the receiving plate 62 pivots upward. A coil spring may be used instead of the leaf spring 63.

Figure 17:
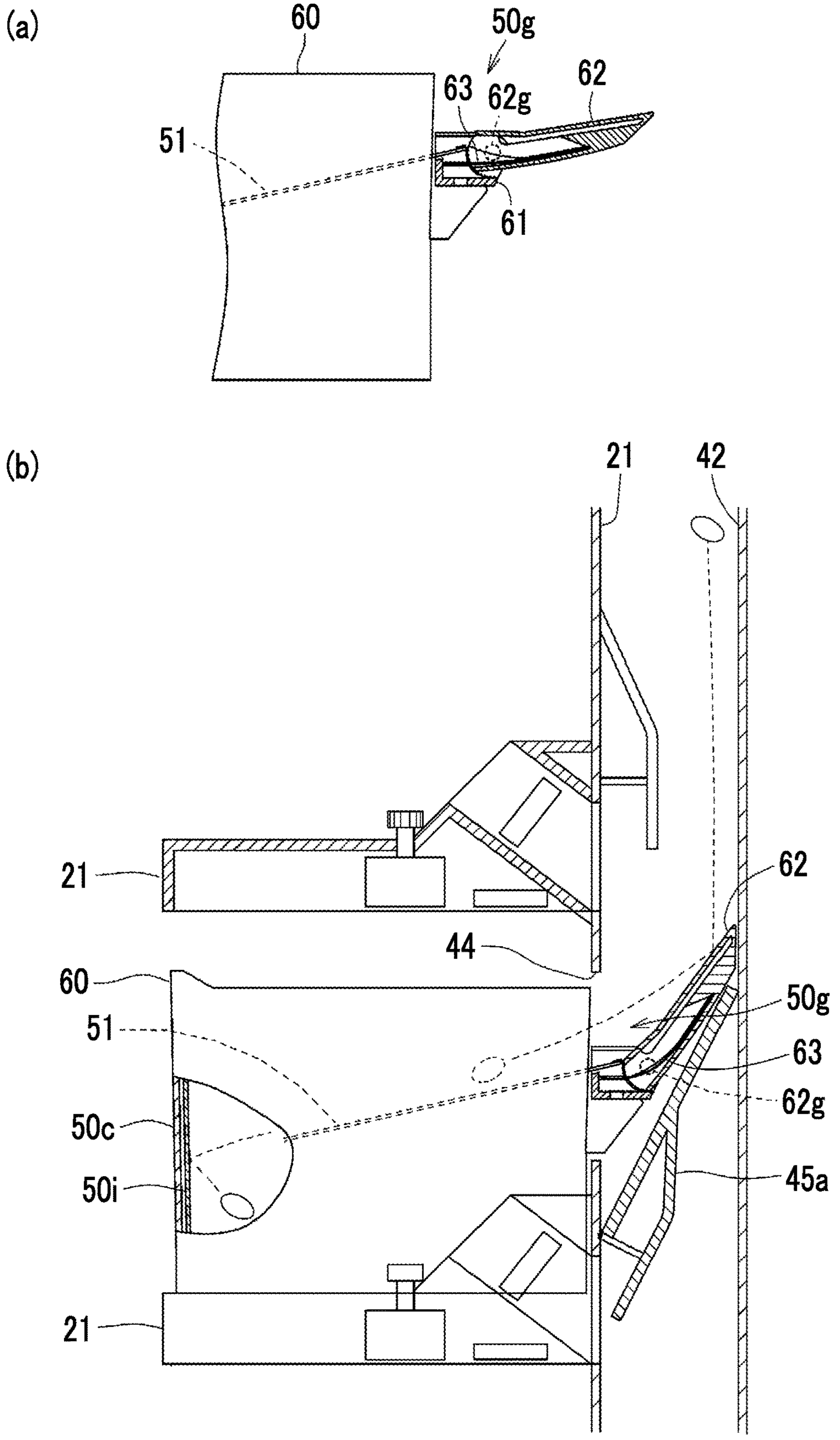
FIG. 17 is a cross-sectional view illustrating an operation of the movable mechanism of the receiving port before the tablet receptacle is mounted and after the tablet receptacle is mounted.

As illustrated in FIG. 17(*a*), before the tablet receptacle 60 is mounted on a predetermined mounting part 12, the receiving plate 62 of the receiving port 50*g* of the tablet receptacle 60 is in a gently inclined state, and is located at a position lower than the receptacle insertion port 44. Therefore, as illustrated in FIG. 17(*b*), when the tablet receptacle 60 is placed on the mounting part 62 and pushed forward, the rebounding prevention member 45*a* is pushed so that the receiving plate 62 is inserted into the receptacle insertion port 44. When the tablet receptacle 60 is further pushed, the tip of the receiving plate 62 collides with the tablet dropping passage 42 and is pushed upward against a biasing force of the leaf spring 63 due to a reaction force thereof. Accordingly, the inclination angle becomes steep. The receiving plate 62 remains colliding with the tablet dropping passage 42 due to the leaf spring 63. Therefore, no gap is generated. In addition, the receiving plate 62 is steeply inclined. Accordingly, the tablets dispensed from the upper tablet cassette 11 collide with the receiving plate 62 and vigorously enter the inside of the tablet receptacle 60. Therefore, the entrance of the tablet receptacle 60 is not clogged with the tablets. When the tablet receptacle 60 is detached from the mounting part 62, the receiving plate 62 returns to an original state where the receiving plate 62 is gently inclined due to the biasing force of the leaf spring 63.

The tablets vigorously entering the inside of the tablet receptacle 60 collide with the wall of the front surface portion 50*c* of the tablet receptacle 60, thereby generating an impact sound. Therefore, in order to reduce the impact sound, the impact sound is reduced by providing a buffer plate 50*i* inside the front surface portion 50*c* of the tablet receptacle 60. The impact sound may be further reduced by providing a gap between the wall of the front surface portion 50*c* and the buffer plate 50*i*.

<Ejecting Prevention Mechanism of Tablets>

Figure 18:
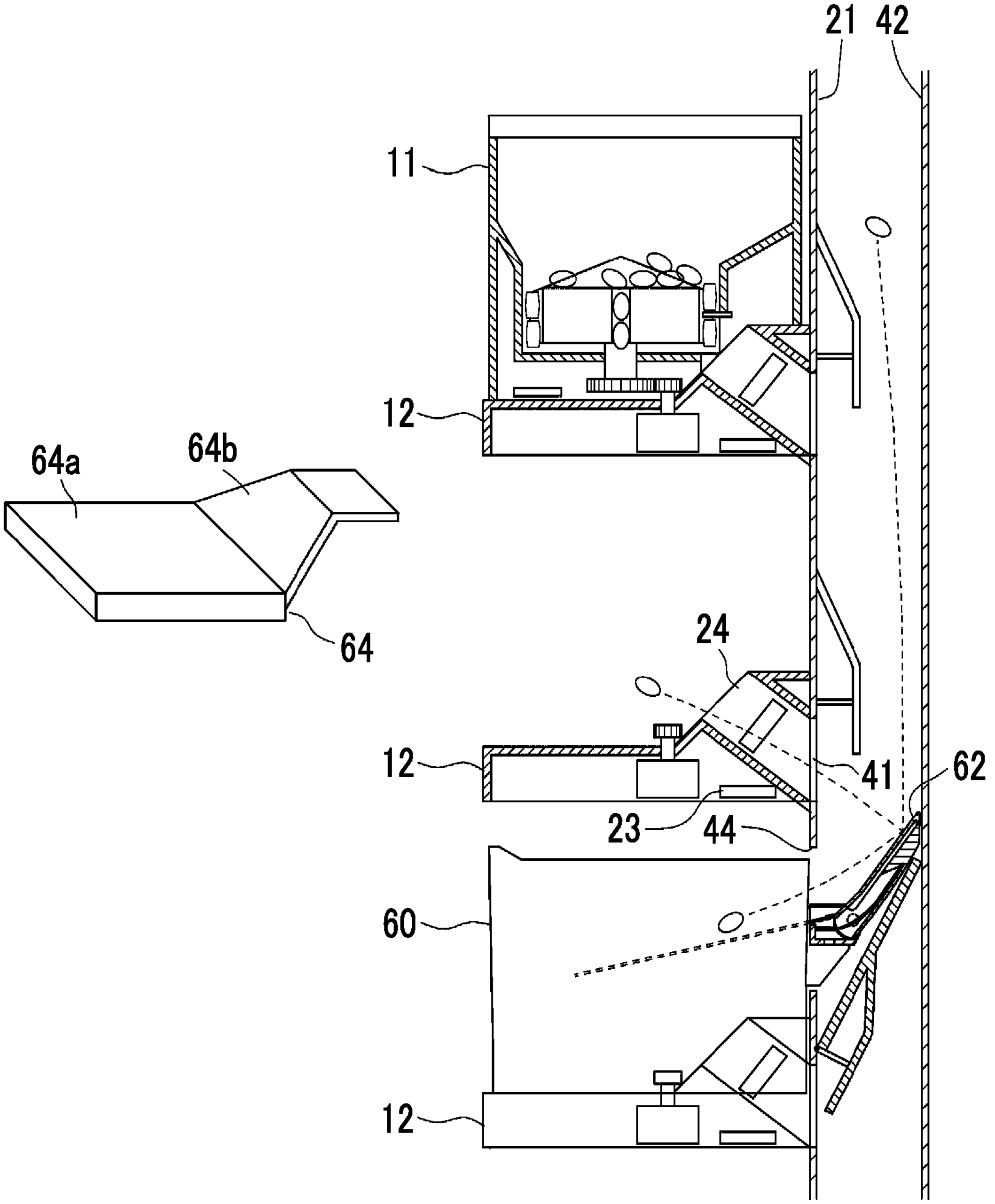
FIG. 18 is a cross-sectional view illustrating an ejecting prevention cover for a tablet rebounding in a receiving plate.

As illustrated in FIG. 18, when the tablets colliding with the receiving plate 62 of the tablet receptacle 60 do not enter the inside of the tablet receptacle 60, rebound upward to enter the upper tablet discharge port 41, and the tablet cassette 11 does not exist, there is a possibility that the tablets may be ejected outward from the tablet discharge passage 24.

Therefore, before the tablets are counted, the RFID reader/writer 23 determines whether or not the tablet cassette 11 exists in the mounting part 12 located one above the mounting part 12 on which the tablet receptacle 60 is mounted. When the tablet cassette 11 does not exist, a user is urged to mount the tablet cassette 12 or an ejecting prevention cover 64. The ejecting prevention cover 64 has a base portion 64*a* mountable on the mounting part 12 in the same manner as the tablet cassette 11, and a closing portion 64*b* which is means for closing the tablet discharge passage 24. Since the tablet cassette 11 or the ejecting prevention cover 64 is mounted on the mounting part 12 located one above the mounting part 12 on which the tablet receptacle 60 is mounted, the tablets rebounding in the receiving plate 62 can be prevented from being ejected outward from the upper tablet discharge port 41.

<Vibration Mechanism of Tablet Receptacle>

Depending on a gap between the tablets discharged to the tablet receptacle 60 or a stacking method of the tablets, the tablet receptacle 60 may not be able to accommodate the tablets up to accommodation capacity of the receptacles. In addition, the tablets may be accumulated on the tablet guide 51, and the receiving port 50*g* may be clogged with the tablets.

Figure 19:
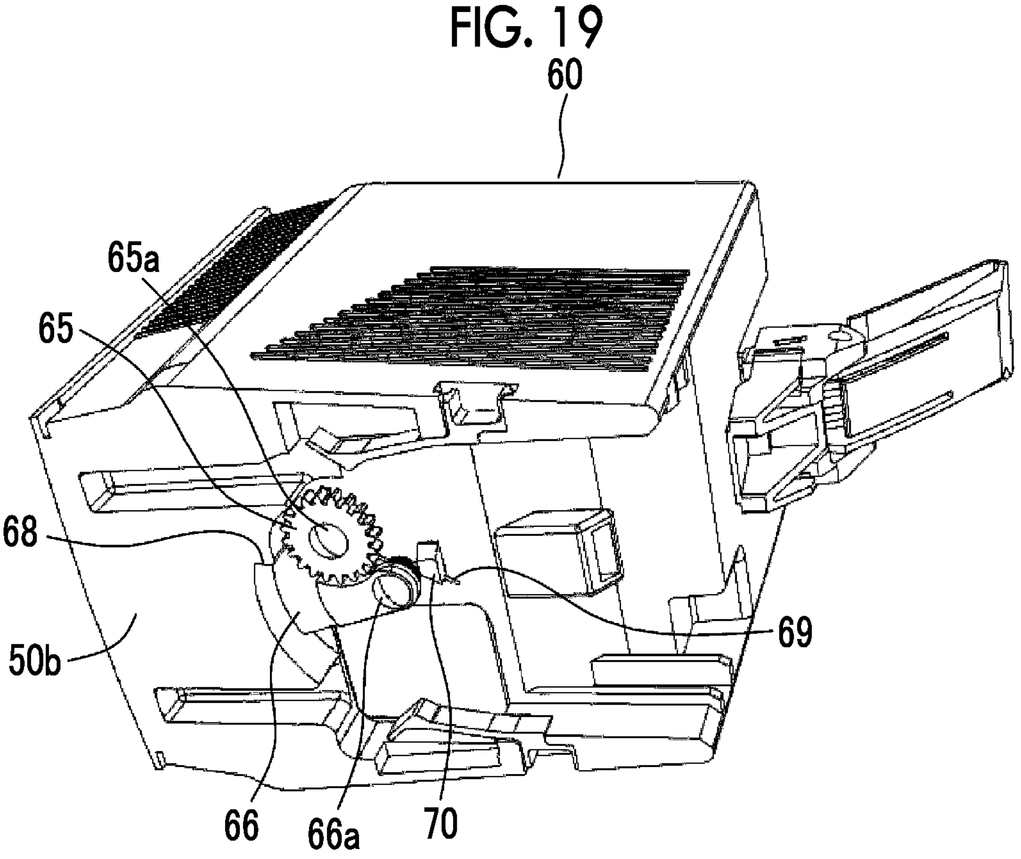
FIG. 19 is a perspective view illustrating a vibration mechanism in a bottom portion of the tablet receptacle.
Figure 20:
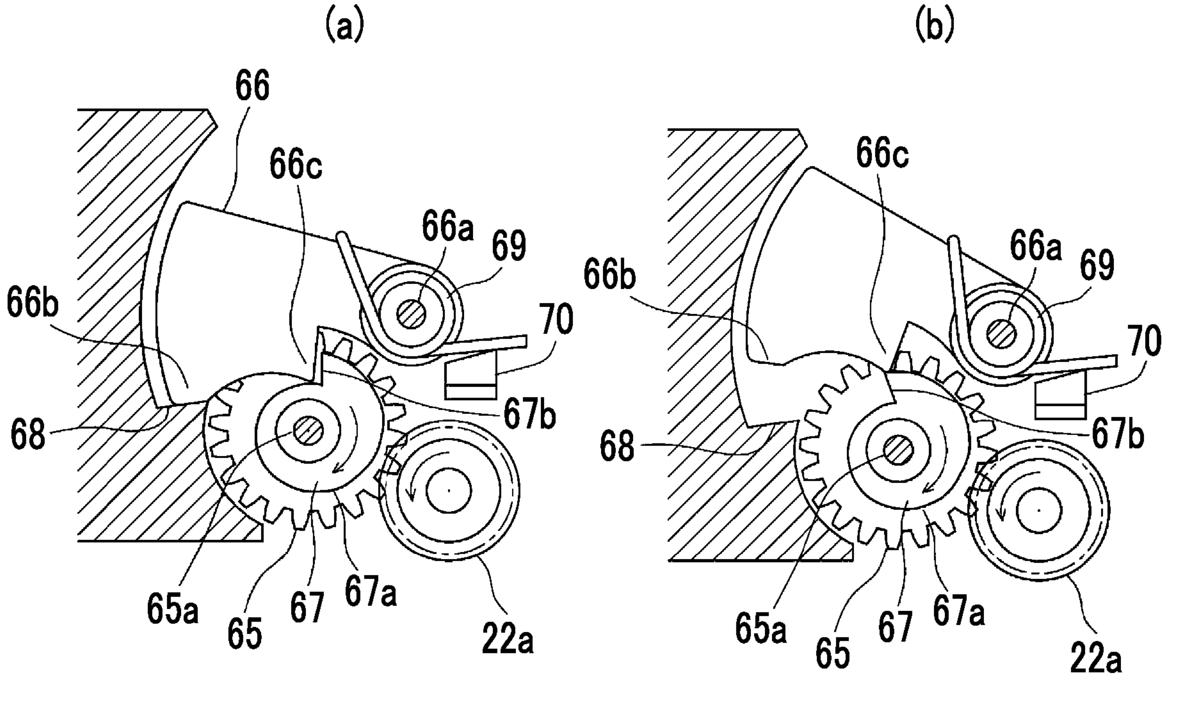

FIG. 19 illustrates the tablet receptacle 60 having a vibration mechanism for vibrating the bottom portion 50*b*. The vibration mechanism is configured to include a gear 65 and a movable block 66.

The gear 65 is integrally formed with a cam 67, and is attached to bottom portion 50*b* of tablet receptacle 60 to be rotatable around a shaft 65*a*. An outer peripheral surface of the cam 67 includes a cam surface 67*a* whose radius gradually increases from an axis of the gear 65, and a stepped portion 67*b* formed between a minimum radius position and a maximum radius position. The gear 65 meshes with a drive gear 22*a* of the drive motor 22 of the mounting part 12 when the tablet receptacle 60 is mounted on the mounting part 12, and is rotated by the drive motor 22. Therefore, since a drive source for driving the tablet cassette 11 is used, there is no need to provide a power source for the vibration mechanism in the tablet receptacle 60.

The movable block 66 is attached to an outer surface of the bottom portion 50*b* of the tablet receptacle 60 to be pivotable around a shaft 66*a*. The movable block 66 has an impact portion 66*b* which can come into contact with an impact receiving portion 68 formed in the bottom portion 50*b* of the tablet receptacle 60, and a sliding portion 66*c* which comes into sliding contact with the cam surface 67*a* of the cam 67. A torsion spring 69 is mounted on the shaft 66*a* of the movable block 66. One end of the torsion spring 69 engages with a protrusion portion 70 formed in the bottom portion 50*b* of the tablet receptacle 60, and the other end engages with the movable block 66. In this manner, the movable block 66 is biased in a direction in which the impact portion 66*b* comes into contact with the impact receiving portion 68.

While the tablet receptacle 60 is mounted on the mounting part 12 and the tablets are counted after being discharged from the tablet cassette 11 located above the mounting part 12, the drive motor 22 of the mounting part 12 on which the tablet receptacle 60 is mounted is driven. Since the drive motor 22 is driven, the cam 67 rotates via the gear 65 meshing with the drive gear 22*a*. As the sliding portion 66*c* of the movable block 66 slides on the cam surface 67*a* of the cam 67 from the minimum radius portion toward the maximum radius portion, the movable block 66 pivots in a direction in which the impact portion 66*b* is separated from the impact receiving portion 68.

Simultaneously when the sliding portion 66*c* of the movable block 66 moves to the minimum radius portion over the stepped portion 67*b* from the maximum radius portion of the cam surface 67*a*, the impact portion 66*b* of the movable block 66 collides with the impact receiving portion 68, and applies an impact to the bottom portion 50*b* of the tablet receptacle 60. Each time the cam 67 rotates once, the impact portion 66*b* of the movable block 66 applies the impact to the impact receiving portion 68. As a result, the tablet receptacle 60 is periodically vibrated. As a result, a gap between the tablets discharged to the tablet receptacle 60 is clogged, and the tablets are densely stacked. The tablets can be sufficiently accommodated up to accommodation capacity of the tablet receptacle 60. In addition, the vibration of the bottom portion 50*b* is transmitted to the tablet guide 51 so that the tablets on the tablet guide 51 are dropped to the bottom. Therefore, it is possible to prevent the receiving port 50*g* from being clogged due to the tablets accumulated in the tablet guide 51.

Figure 21:
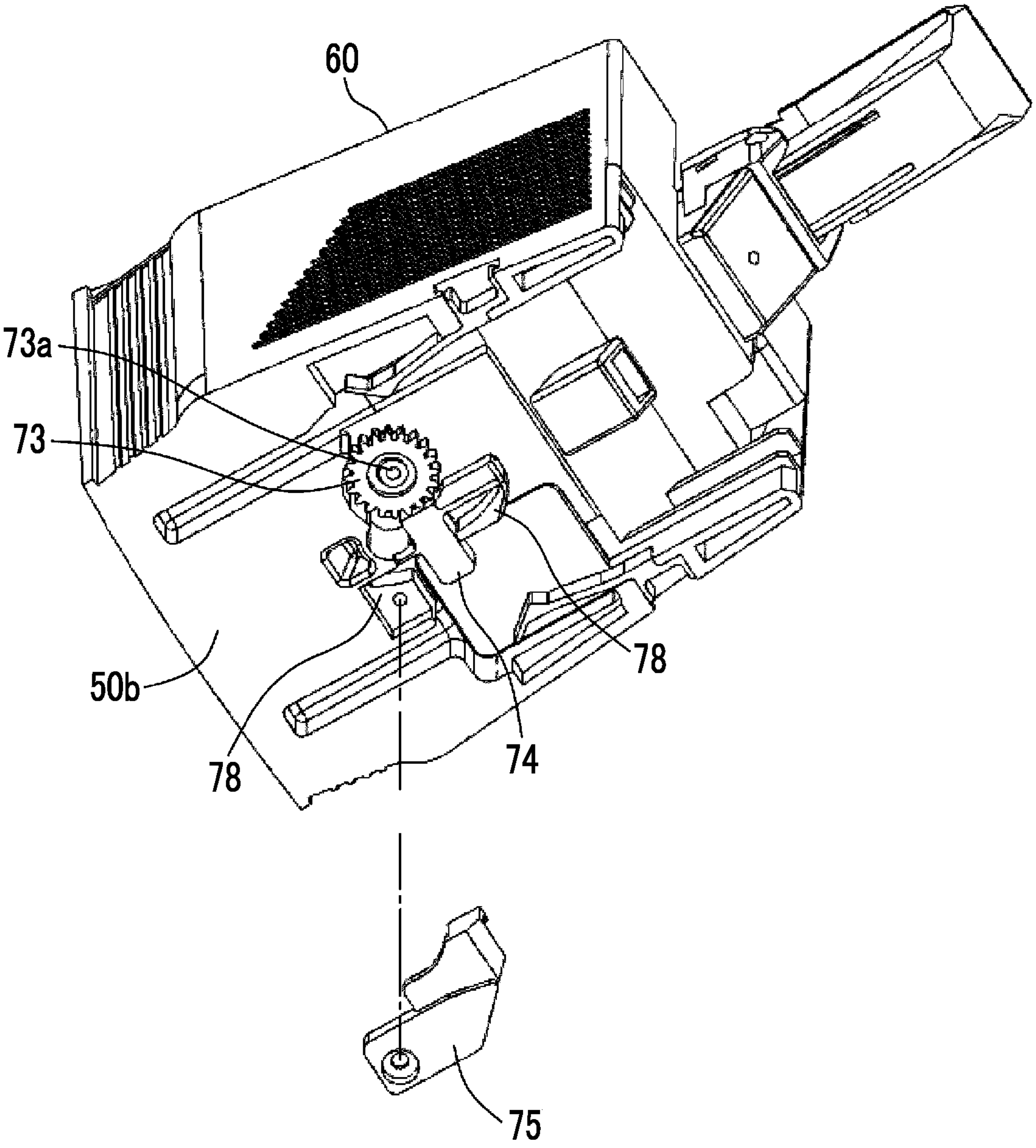
FIG. 21 is an exploded perspective view illustrating a vibration mechanism of a tablet guide of the tablet receptacle.

FIG. 21 illustrates the tablet receptacle 60 including the vibration mechanism for vibrating the tablet guide 51.

Figure 22:
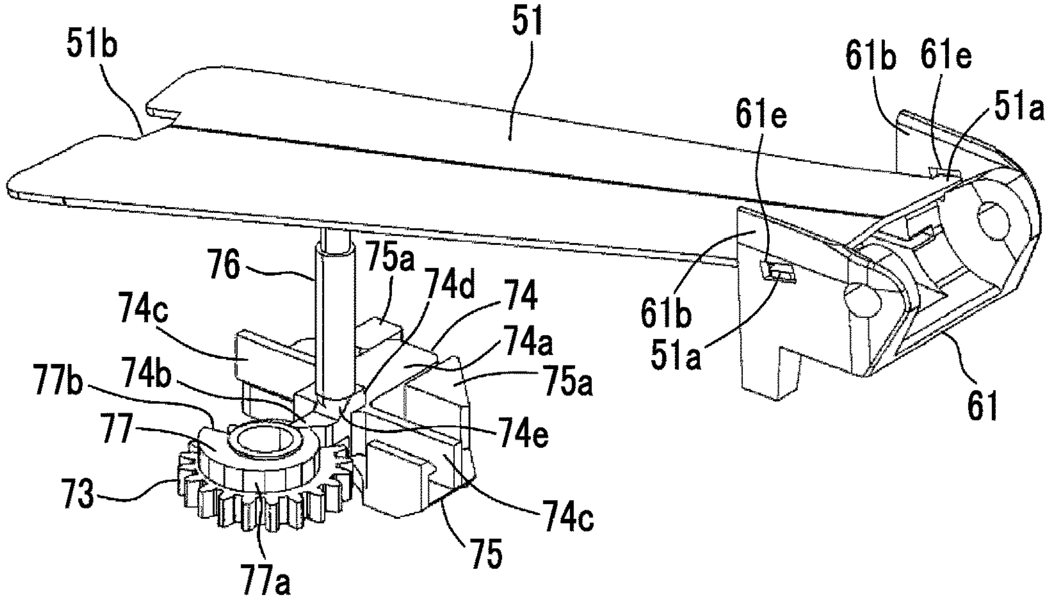
FIG. 22 is a perspective view illustrating a main portion of the vibration mechanism in FIG. 21.
Figure 23:
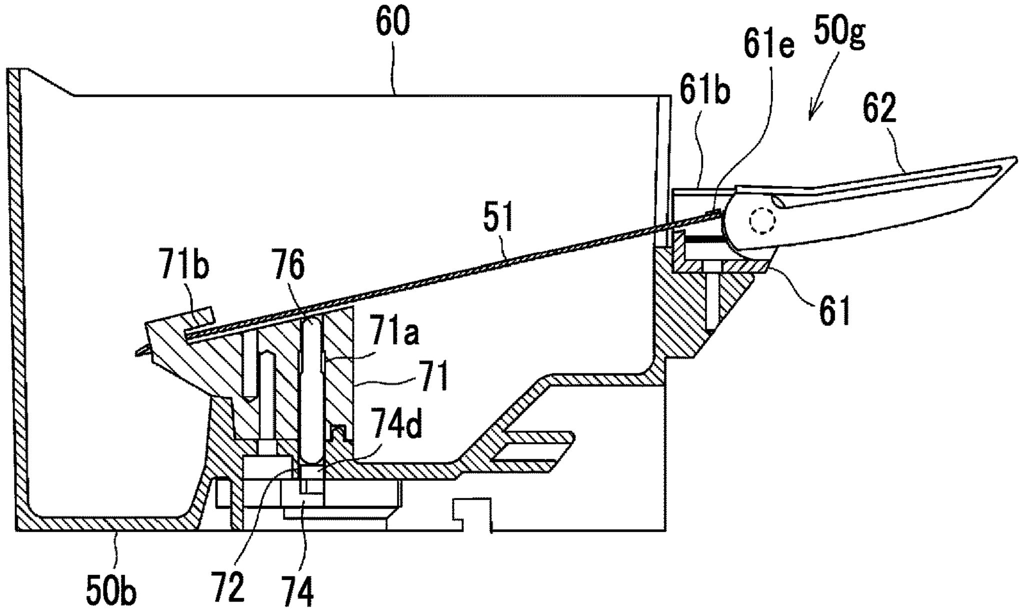
FIG. 23 is a cross-sectional view illustrating the vibration mechanism of the tablet guide.

As illustrated in FIGS. 22 and 23, in the tablet guide 51, a support protrusion 51*a* provided on both sides of one end engages with the support hole 61*e* formed in the rising piece 61*b* of the support portion 61 of the receiving port 50*g*, and the other end is supported by a pillar 71 provided on an inner surface of the bottom portion 50*b* of the tablet receptacle 60. In this manner, the tablet guide 51 is inclined downward and inward from the receiving port 50*g* of the tablet receptacle 60. The pillar 71 is formed so that a rod insertion hole 71*a* into which a thrust rod 76 (to be described later) is inserted communicates with a through-hole 72 of the bottom portion 50*b*. In addition, the pillar 71 is provided with an engagement portion 71*b* with which a cutout 51*b* in a lower end of the tablet guide 51 engages.

As illustrated in FIG. 22, the vibration mechanism is configured to include a gear 73, a movable block 74, a cover 75, and a thrust rod 76.

The gear 73 is formed integrally with the cam 77, and is attached to the outer surface of the bottom portion 50*b* of the tablet receptacle 60 to be rotatable around a shaft 73*a*. The outer peripheral surface of the cam 77 includes a cam surface 77*a* whose radius gradually increases from the axis of the gear 73, and a stepped portion 77*b* formed between the minimum radius position and the maximum radius position. The gear 73 meshes with the drive gear 22*a* of the drive motor 22 of the mounting part 12 when the tablet receptacle 60 is mounted on the mounting part 12, and is rotated by the drive motor 22. Therefore, there is no need to provide a power source for the vibration mechanism in the tablet receptacle 60.

Figure 24:
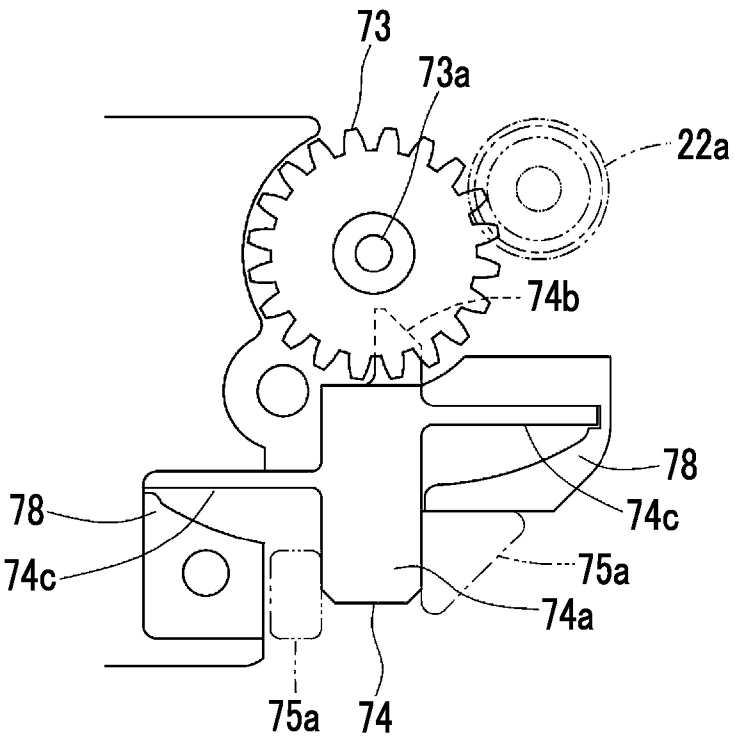
FIG. 24 is a bottom view illustrating the vibration mechanism of the tablet guide.

The movable block 74 has a base portion 74*a* having an elongated rectangular parallelepiped body, a sliding portion 74*b* protruding from one end surface of the base portion 74*a*, two elastically deformable elastic pieces 74*c* protruding from both side surfaces of the base portion 74*a*, and a protrusion portion 74*d* protruding to the upper surface of the base portion 74*a*. As illustrated in FIG. 24, in the movable block 74, the base portion 74*a* is disposed to be movable between two guides 75*a* formed in a cover 75 (to be described later). The tip of the elastic piece 74*c* is supported by the support portion 78 formed in the bottom portion 50*b* of the tablet receptacle 60. The sliding portion 74*b* is in contact with the cam surface 77*a* of the cam 77. The protrusion portion 74*d* has an inclined surface 74*e* inclined in a moving direction of the base portion 74*a* with a downward slope toward the sliding portion 74*b*. A space for allowing deformation of the elastic piece 74*c* is formed between the elastic piece 74*c* and the support portion 78 that supports the tip of the elastic piece 74*c*.

The cover 75 is attached to the bottom portion 50*b* of the tablet receptacle 60 to cover the movable block 74. The cover 75 has two guides 75*a* for guiding the base portion 74*a* of the movable block 74.

The thrust rod 76 is inserted into a rod insertion hole 71*a* of the pillar 71 from the through-hole 72 provided in the bottom portion 50*b* of the tablet receptacle 60. The upper end of the thrust rod 76 faces the lower surface of the tablet guide 51, and the lower end faces the protrusion portion 74*d* of the movable block 74.

Figure 25:
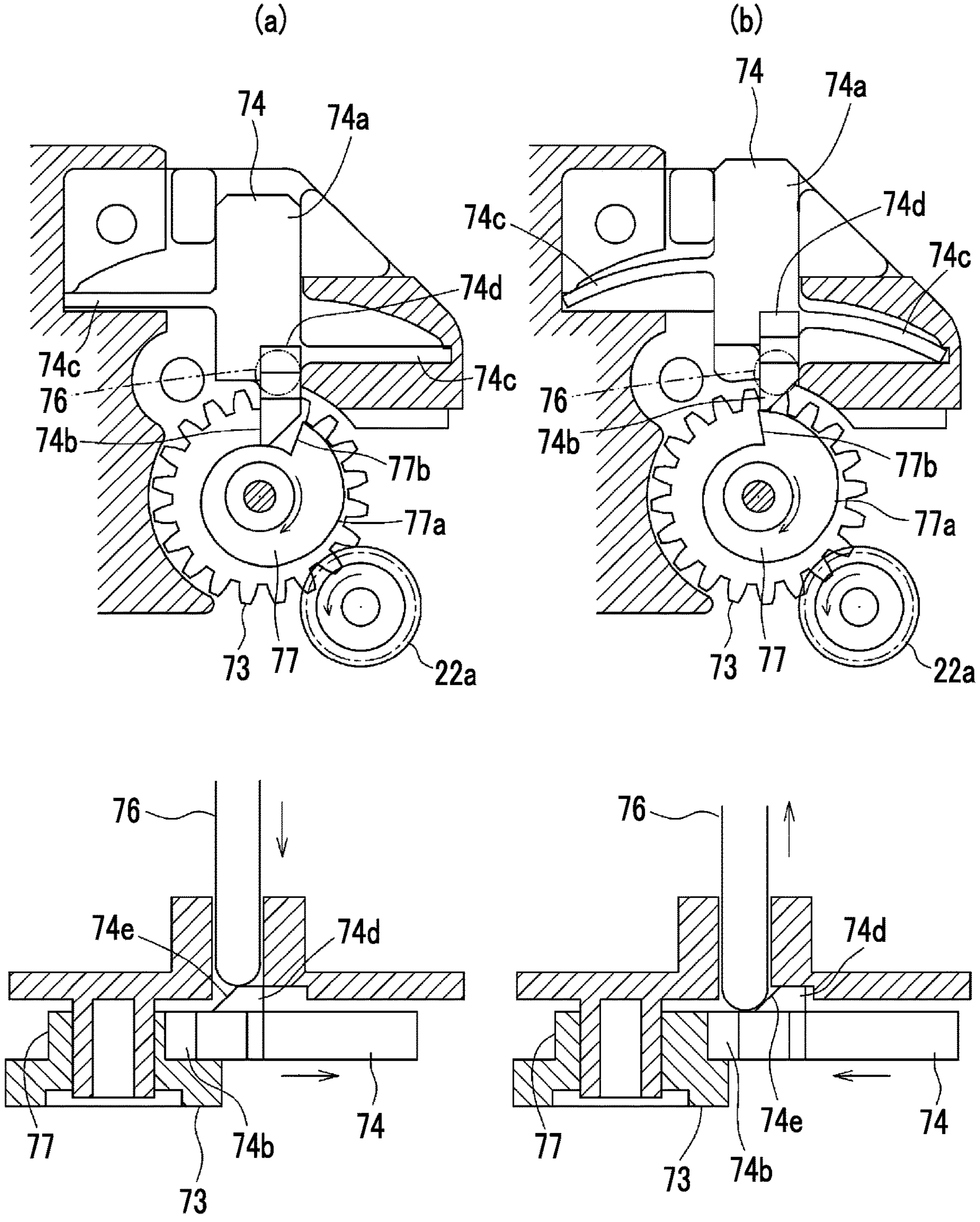
FIG. 25 is a plan view illustrating an operation of the vibration mechanism of the tablet guide.

While the tablet receptacle 60 is mounted on the mounting part 12 and the tablets are counted after being discharged from the tablet cassette 11 located above the mounting part 12, the drive motor 22 of the mounting part 12 on which the tablet receptacle 60 is mounted is driven. As illustrated in FIG. 25(*a*), since the drive motor 22 is driven, the cam 77 rotates via the gear 73 meshing with the drive gear 22*a*. As the sliding portion 74*b* of the movable block 74 slides on the cam surface 77*a* of the cam 77 from the minimum radius portion toward the maximum radius portion, the movable block 74 moves in a direction in which the protrusion portion 74*d* is separated from the cam 77, and the elastic piece 74*c* deforms. The lower end of the thrust rod 76 which comes into contact with the protrusion portion 74*d* of the movable block 74 moves to a lower end of an inclined surface 74*e* of the protrusion portion 74*d*, and the upper end is separated from the tablet guide 51.

As illustrated in FIG. 25(*b*), simultaneously when the sliding portion 74*b* of the movable block 74 moves to the minimum radius portion over the stepped portion 77*b* from the maximum radius portion of the cam surface 77*a*, due to the biasing force of the elastic piece 74*c*, the movable block 74 momentarily moves in a direction the protrusion portion 74*d* is closer to the cam 77. As a result, the lower end of the thrust rod 76 is pushed up by the inclined surface 74*e* of the protrusion portion 74*d* of the movable block 74, and the upper end pushes up the tablet guide 51 to apply an impact. Each time the cam 77 rotates once, the thrust rod 76 of the movable block 74 applies the impact to the tablet guide 51. As a result, the tablets on the tablet guide 51 are dropped to the bottom. Therefore, the receiving port 50*g* can be prevented from being clogged with the tablets accumulated in the tablet guide 51. In addition, the vibration of the tablet guide 51 is transmitted to the pillar 71, and the tablet receptacle 60 is periodically vibrated. As a result, a gap between the tablets discharged to the tablet receptacle 60 is clogged, and the tablets are densely stacked. The tablets can be sufficiently accommodated up to accommodation capacity of the tablet receptacle 60.

While the vibration mechanism is operated, the vibration of the tablet receptacle 60 or the tablet guide 51 generates a tapping sound, thereby causing a possibility that a user may feel discomfort. Therefore, it is preferable to change the presence or absence of the vibration and a vibration interval, depending on a mounting height of the tablet cassette 11 serving as the stocktaking object and a shape of the tablets accommodated in the tablet cassette 11.

For example, when the tablet receptacle 60 is mounted on the first stage of the tablet supply unit 2, the vibration mechanism is operated only when the tablets in the tablet cassette 11 in the second stage are counted and dispensed. The reason is as follows. When the tablets are dispensed from the tablet cassette 11 in the third stage or a higher stage, a dropping speed of the tablets increases. Therefore, the inside of the tablet receptacle 60 is clogged with the tablets without any gap, and the tablets are dropped without staying in the tablet guide 51.

When the tablets are capsules, a gap between the capsules tends to increase. Therefore, the vibration mechanism is operated regardless of a height from the tablet receiving container 60.

In addition, as an area viewed from above the tablets increases, the gap between the capsules tends to increase. Therefore, the vibration interval is reduced. In this case, the area viewed from above the tablets is divided into three types to change the vibration interval. For example, when the area of the tablets is larger than 100 $mm^2$, the tablet receptacle 60 is vibrated once every 7 seconds. When the area of the tablets is 56 to 100 $mm^2$, the tablet receptacle 60 is vibrated once every 14 seconds. When the area of the tablets is smaller than 56 $mm^2$, the tablet receptacle 60 is vibrated once every 7 seconds.

Furthermore, until a volume of the tablets discharged into the tablet receptacle 60 reaches a predetermined ratio (for example, 75%) with respect to a maximum accommodation volume of the tablet receptacle 60, the tablet receptacle 60 is vibrated at a predetermined vibration interval. When the volume exceeds the predetermined ratio, the tablet receptacle 60 is continuously vibrated.

In this way, the presence or absence of the vibration and the vibration interval are changed, depending on the mounting height of the tablet cassette 11 serving as the stocktaking object and the shape of the tablets accommodated in the tablet cassette 11. In this manner, the tablets can be discharged up to the accommodation capacity of the tablet receptacle 60 at minimum tapping times, and the sound can be reduced when the tablets are counted.

The present invention is not limited to the above-described embodiments, and variations and modifications can be made within the scope of the invention described in the appended claims.

Figure 26:
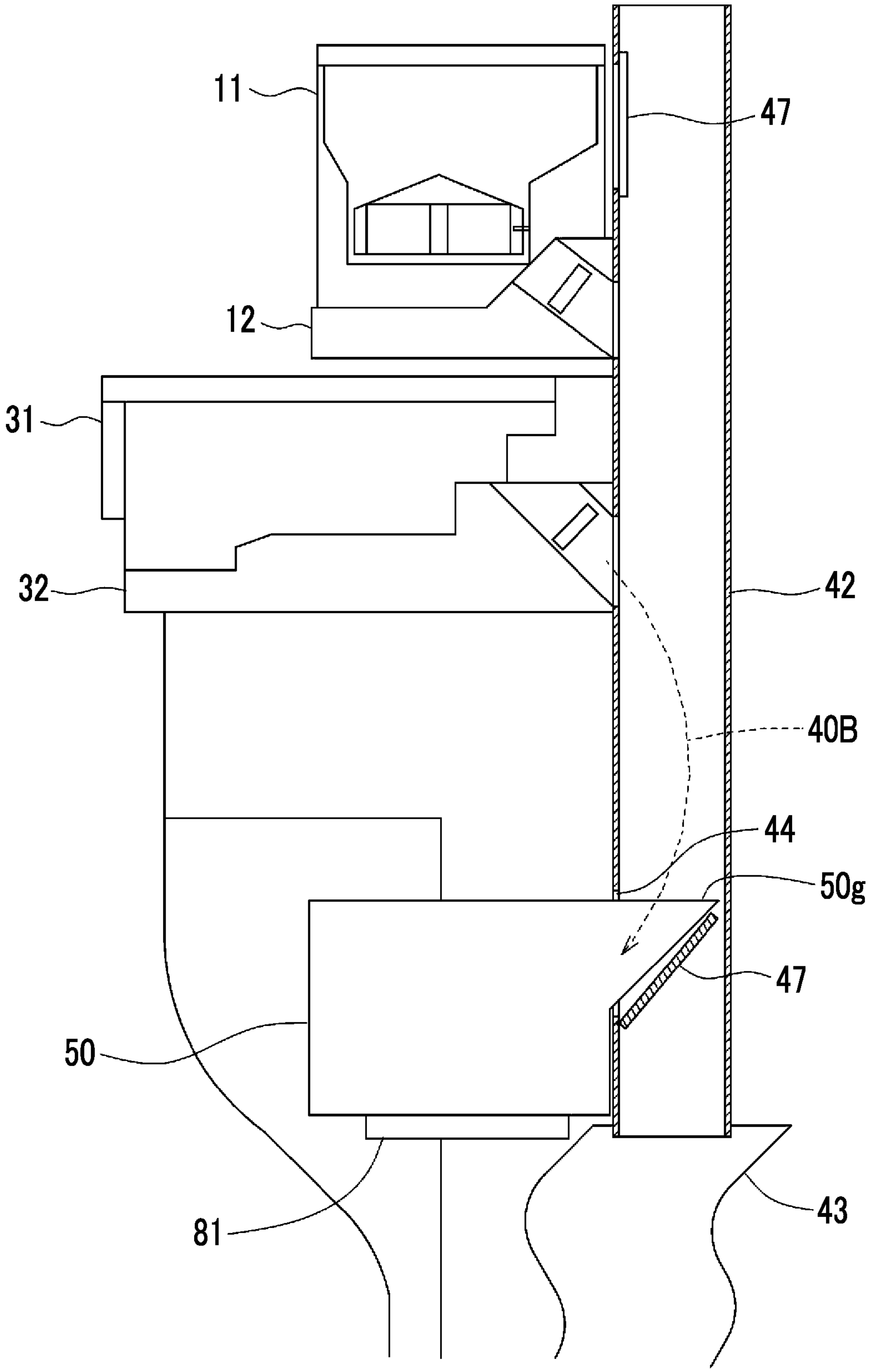
FIG. 26 is a cross-sectional view illustrating a modification example of the disposition of the tablet receptacle.

For example, the tablet receptacle 50 according to the above-described embodiment is mounted by being replaced with the tablet cassette 11. However, as illustrated in FIG. 26, the stocktaking process of the tablets remaining in the universal cassette 31 can be performed by installing the tablet receptacle 50 on a placement part 81 below the universal cassette 31 and above the guide hopper 43.

Figure 27:
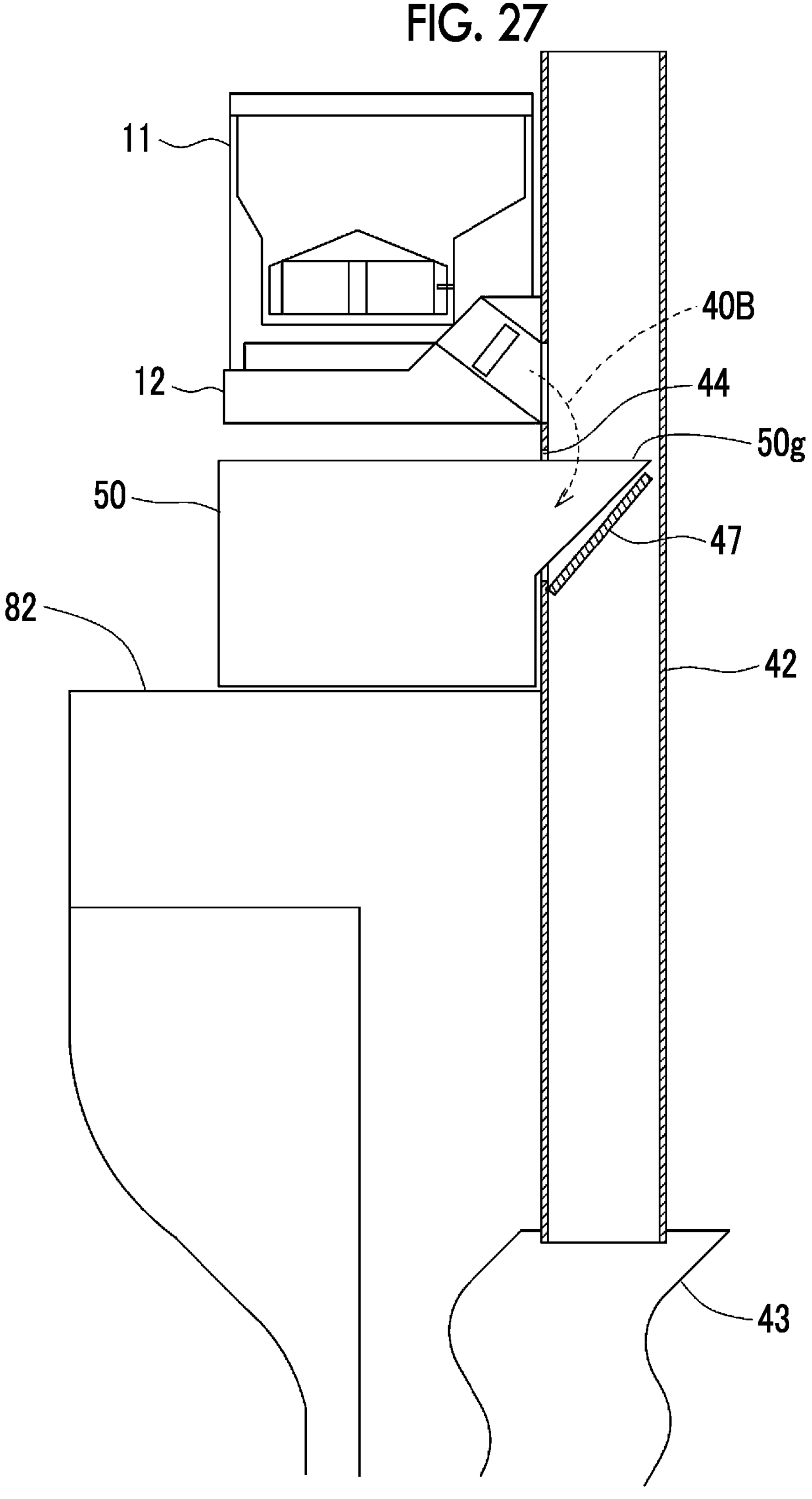
FIG. 27 is a cross-sectional view illustrating another modification example of the disposition of the tablet receptacle.

In addition, as illustrated in FIG. 27, time and labor for replacing the tablet cassette 11 can be saved by providing a placement part 82 of the tablet receptacle 50.

Figure 28:
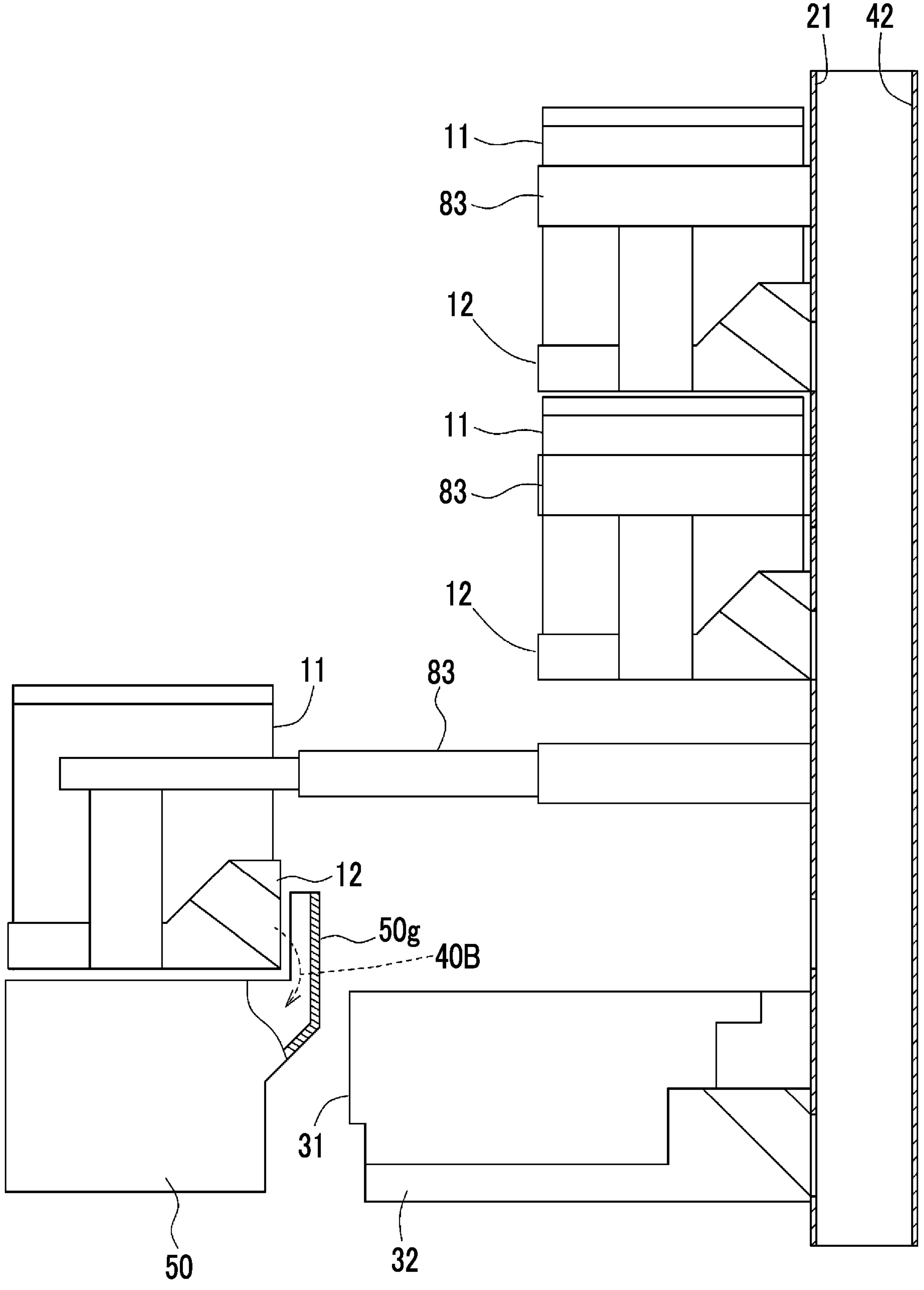
FIG. 28 is a cross-sectional view illustrating an example of attaching the tablet receptacle by pulling out the tablet cassette and a mounting part thereof.

FIG. 28 illustrates a configuration as follows. The mounting part 12 on which the tablet cassette 11 is mounted can be pulled out along a telescopic slide rail 83. When the stocktaking process is performed, the mounting part 12 is pulled out from the device body 20 while the tablet cassette 11 is mounted. The tablet receptacle 50 is attached below the mounting part 12 so that the tablets discharged from the tablet discharge passage 24 of the mounting part 12 can be received from the receiving port 50*g*.

Figure 29:
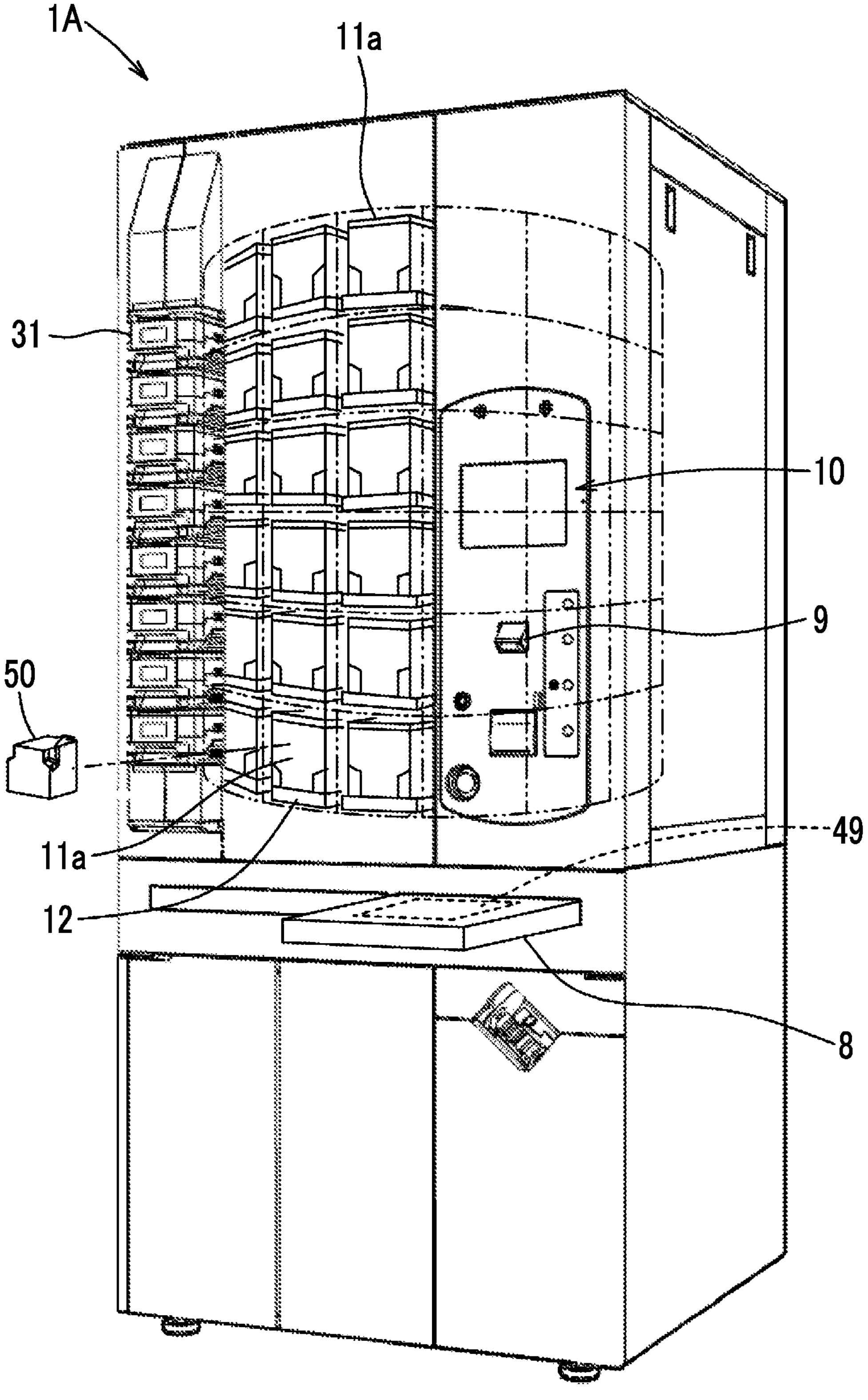
FIG. 29 is a perspective view illustrating a disposition of a tablet receptacle in a drum-type drug dispensing device.

In the above-described embodiment, the stocktaking process of the tablet cassettes 11 arranged in a shelf shape of the drug dispensing device 1 has been described. However, as illustrated in FIG. 29, the present invention can also be used for the stocktaking process of a drug dispensing device 1A having variable tablet cassette 11*a* arranged in a drum type and universal tablet cassettes 31 arranged upward and downward. The variable tablet cassette 11*a* is a well-known one in which the width and the depth of the tablet guide groove 15 of the rotor 16 and the height of the partition member 17 can be adjusted in accordance with the size and the shape of the tablets accommodated in the tablet accommodation unit 13 (for example, refer to JP-A-2018-126528).

Figure 30:
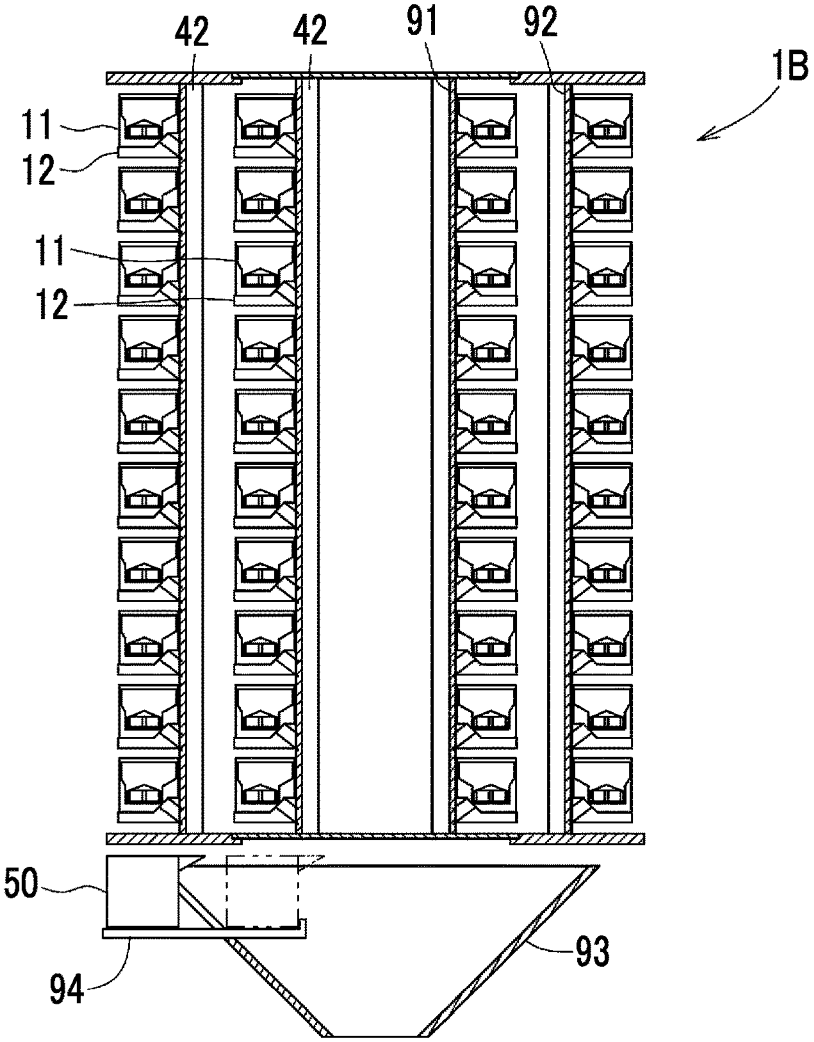
FIG. 30 is a front view and a plan view illustrating a disposition of a tablet receptacle in a double-drum powder medicine dispensing device.
Figure 30:
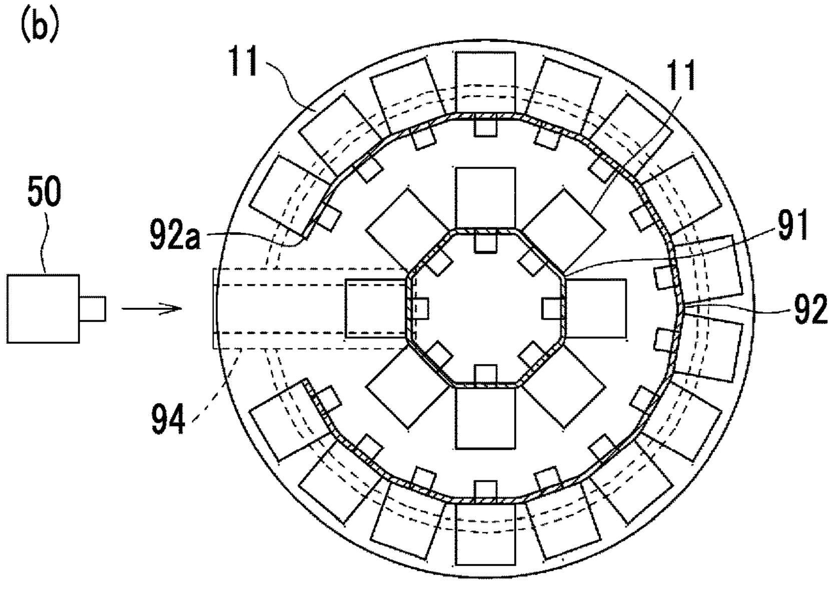

FIG. 30 illustrates a drug dispensing device 1B having the tablet cassettes 11 arranged on inner and outer double drums 91 and 92. The tablet receptacle 50 can be mounted on a large hopper 93 in which the tablets discharged from the inner and outer tablet cassettes 11 are guided to a packaging unit (not illustrated). In the drug dispensing device 1B, an opening portion 92*a* is provided in a part on the front side of the outer drum 92 so that the tablet cassette 11 is attachable to and detached from the inner drum 91. In addition, a portion of the large hopper 93 located below the opening portion 92*a* is cut out, and a placement part 94 on which the tablet receptacle 50 can be placed is provided. The tablet receptacle 50 can be placed on the placement part 94, and the tablets discharged from the tablet cassette 11 of the outer drum 92 can be received. In addition, when the tablet receptacle 50 is installed deeper, the tablets discharged from the tablet cassette 11 of the inner drum 91 can be received.

Figure 31:
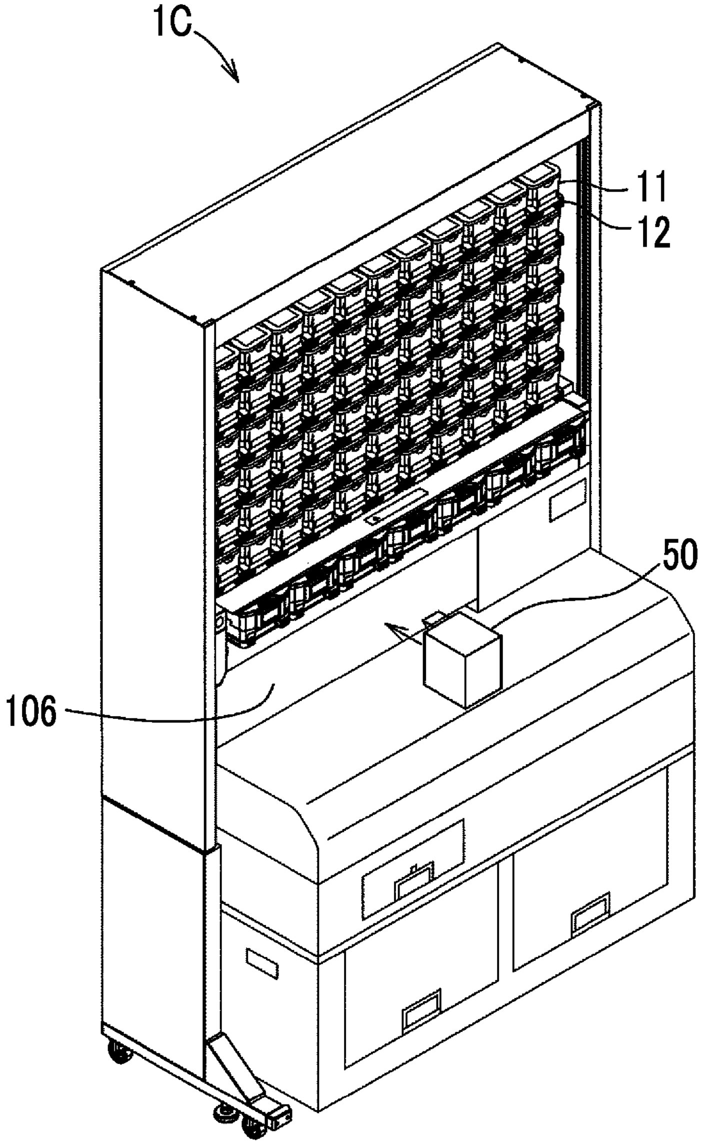
FIG. 31 is a perspective view illustrating a disposition of a tablet receptacle in a powder medicine dispensing device for blister pack packaging.
Figure 32:
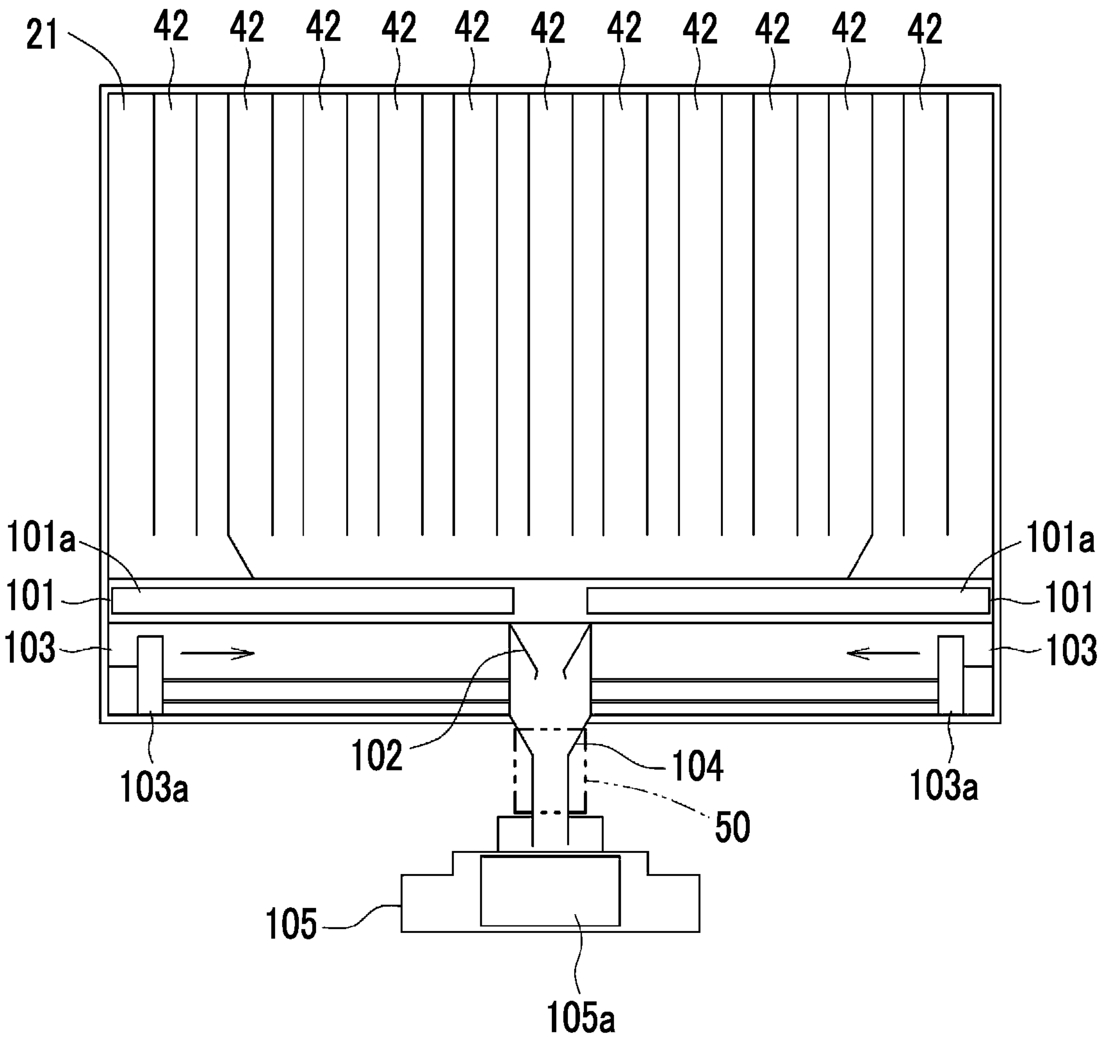
FIG. 32 is a rear view illustrating an interior of the powder medicine dispensing device in FIG. 31.

FIG. 31 illustrates a drug dispensing device 1C capable of packaging tablets discharged from a tablet cassette 11 arranged in a shelf shape into a blister pack, in which a tablet receptacle 50 can be mounted at one central location. As illustrated in FIG. 32, this drug dispensing device 1C includes two left and right tablet receiving portions 101, a central tablet guide 102, a tablet conveying portion 103, a central dropping passage 104, and a tablet extruding portion 105.

As illustrated in FIG. 32, the tablet receiving portion 101 includes a standby valve 101*a* for receiving the tablets below the tablet dropping passage 42 on a rear surface of the wall portion 21 provided with the mounting part 12 on which the tablet cassette 11 is mounted. The central tablet guide 102 is located between the two tablet receiving portions 101, and guides the tablets dropped to the central dropping passage 104 from the central tablet dropping passage 42. The tablet conveying portion 103 includes a tablet conveying piece 103*a* which is movable leftward and rightward and conveys the tablet dropped from the tablet receiving portion 101 to the central dropping passage 104 below the central tablet guide 102. The central dropping passage 104 guides the tablets conveyed to the tablet extruding portion 105 from the central tablet guide 102 and the tablet conveying portion 103. The tablet extruding portion 105 includes an extruding block 105*a* which extrudes the tablets dropped from the central dropping passage 104 to a blister pack packaging unit (not illustrated).

The central dropping passage 104 is provided to be attachable and detachable. As illustrated in FIG. 31, the tablet receptacle 50 can be inserted from the front surface by opening a front surface cover 106 of the tablet dispensing device 1C. The tablets can be directly received in the tablet receptacle 50 by moving the tablet cassette 11 serving as the stocktaking object to a center row and discharging the tablets directly downward. In addition, the tablets dropped to the tablet conveying portion 103 from the tablet cassettes 11 below the center row and conveyed from the left and right sides by the tablet conveying pieces 103*a* can be collected by the tablet receptacle 50.

Figure 33:
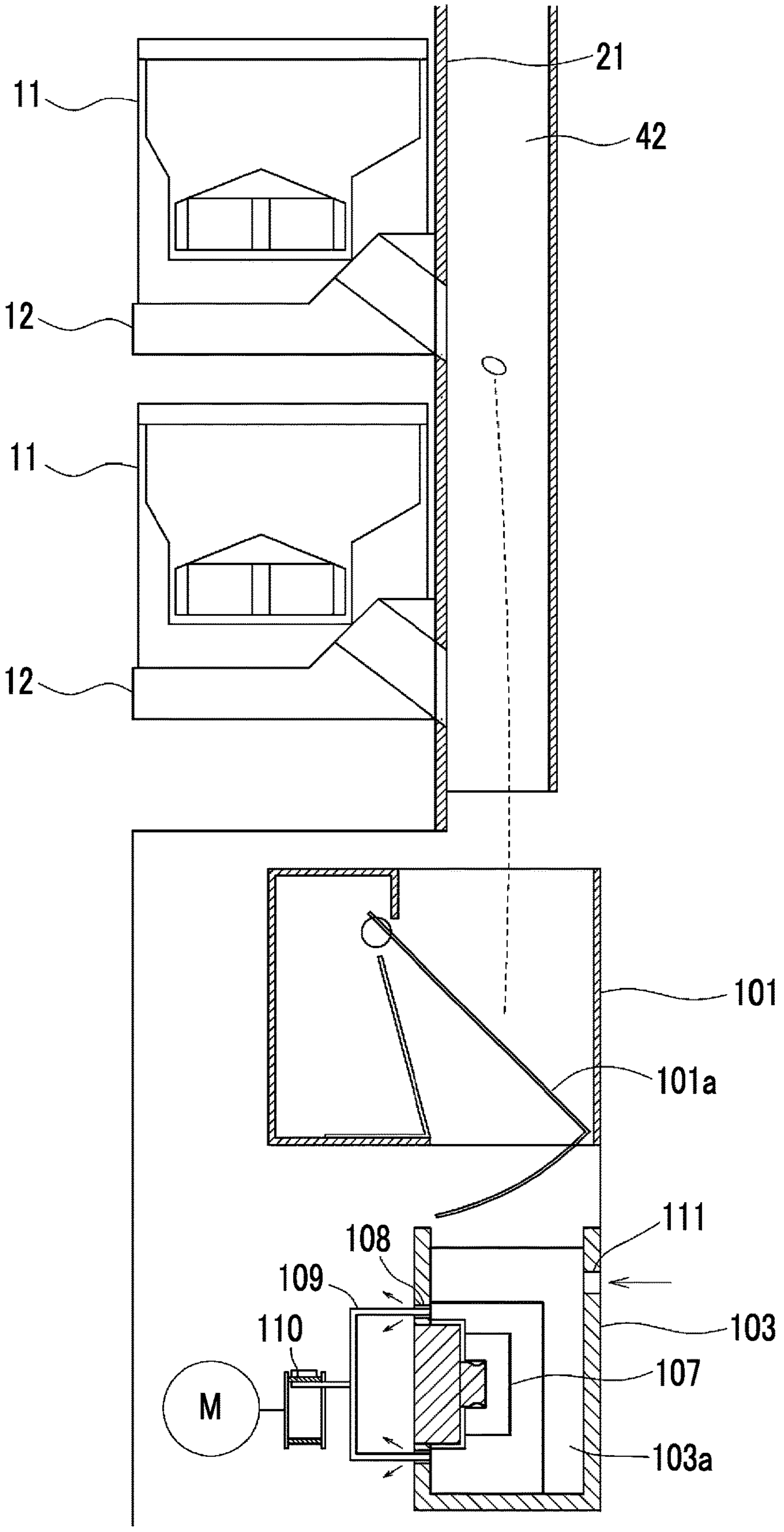
FIG. 33 is a cross-sectional view of the interior of the powder medicine dispensing device in FIG. 31.

As illustrated in FIG. 33, the tablet conveying piece 103*a* of the tablet conveying portion 103 is movable leftward and rightward by an LM guide 107. In order to move the tablet conveying piece 103*a* in a leftward-rightward direction, a drive piece 109 protruding outward of the tablet conveying portion 103 is provided via a slit 108 provided on a wall of the tablet conveying portion 103, and a drive belt 110 is attached to the drive piece 109. In response to the movement of the tablet conveying portion 103, tablet powder enters the inside of the tablet conveying portion 103 together with air from the slit 108, and adheres to the LM guide 107, thereby causing a possibility that the movement of the tablet conveying piece 103*a* may be hindered. Therefore, an air introduction hole 111 is provided in the tablet conveying portion 103, and the air is introduced from a fan (not illustrated) to create a positive pressure state. In this manner, the air is allowed to escape from the slit 108, and the tablet powder is prevented from entering the tablet conveying portion 103.

REFERENCE SIGNS LIST

1, 1A Drug dispensing device
2 First tablet supply unit
3 Second tablet supply unit
4 Tablet supply unit
8 Tablet filling table
9 Bar code reader (receptacle reader)
10 Control unit
11 Tablet cassette
11*a* Variable tablet cassette
12 Mounting part
18 Tablet outlet
19 RFID tag (identification device)
22*a* Drive gear (drive unit)
23 RFID reader/writer (reader)
24 Tablet discharge passage
31 Universal tablet cassette
32 Mounting part
37 Tablet outlet
38 RFID tag (identification device)
40A Tablet packaging passage
40B Tablet receiving passage
41 Tablet discharge port
42 Tablet dropping passage
44 Receptacle insertion port
47 Movable plate
48 Receptacle detection sensor (receptacle detection means)
49 RFID reader/writer (reader)
50 Tablet receptacle
50*g* Receiving port
50*h* Dropping port
51 Tablet guide
52 Shutter
53 Bar code
54 RFID tag (identification device)
60 Tablet receptacle
62 Receiving plate
64 Ejecting prevention cover
64*b* Closing portion
65 Gear (vibration mechanism)
66 Movable block (vibration mechanism)
67 Cam (vibration mechanism)
73 Gear (vibration mechanism)
74 Movable block (vibration mechanism)
76 Thrust rod (vibration mechanism)
77 Cam (vibration mechanism)

The invention claimed is:

1. A tablet receptacle which receives tablets discharged to a tablet dropping passage below a plurality of mounting parts in a drug dispensing device in which the mounting parts on which tablet cassettes are mounted are arranged, and the tablets are packaged by being discharged from the tablet cassettes to the tablet dropping passage, the tablet receptacle comprising:
- a receiving port that receives the tablets discharged to the tablet dropping passage when inserted into the tablet dropping passage,
- wherein tablet receptacle further comprising a tablet guide extending obliquely downward from a bottom portion of the receiving port toward an inside of the tablet receptacle.

2. The tablet receptacle according to claim 1,
- wherein the receiving port includes a receiving plate that is pivotable to have a steep inclination angle formed inward of the tablet receptacle when the tablet receptacle is mounted on the mounting part.

3. A tablet receptacle which is mounted to be replaceable with a tablet cassette on any one of a plurality of mounting parts in a drug dispensing device in which the mounting parts on which the tablet cassettes are mounted are arranged, and tablets are packaged by being discharged from the tablet cassettes to a tablet dropping passage, and which receives the tablets discharged to the tablet dropping passage, the tablet receptacle comprising:
- a receiving port that is inserted into the tablet dropping passage when the tablet receptacle is mounted on the mounting part,
- wherein the receiving port includes a receiving plate that is pivotable to have a steep inclination angle formed inward of the tablet receptacle when the tablet receptacle is mounted on the mounting part.

4. The tablet receptacle according to claim 3, further comprising:
- a vibration mechanism that vibrates the tablet receptacle.

5. The tablet receptacle according to claim 4,
- wherein the vibration mechanism is configured to be driven by a drive unit driving the tablet cassette and provided in the mounting part.

6. The tablet receptacle according to claim 5,
- wherein the vibration mechanism vibrates the tablet guide of the tablet receptacle.

7. The tablet receptacle according to claim 1, further comprising:
- a vibration mechanism that vibrates the tablet receptacle.

8. The tablet receptacle according to claim 7,
- wherein the vibration mechanism is configured to be driven by a drive unit driving the tablet cassette and provided in the mounting part.

9. The tablet receptacle according to claim 3, further comprising:
- a tablet guide extending obliquely downward from a bottom portion of the receiving port toward an inside of the tablet receptacle.

10. The tablet receptacle according to claim 9,
- wherein the vibration mechanism vibrates the tablet guide of the tablet receptacle.

* * * * *